US012109831B2

(12) United States Patent
Sakamoto et al.

(10) Patent No.: US 12,109,831 B2
(45) Date of Patent: Oct. 8, 2024

(54) LASER PROCESSING SYSTEM

(71) Applicant: OMRON CORPORATION, Kyoto (JP)

(72) Inventors: Tatsunori Sakamoto, Kyoto (JP); Yoshimitsu Ashihara, Kyoto (JP); Kazumi Tsuchimichi, Kyoto (JP); Tadamasa Yokoi, Kyoto (JP); Naoki Yoshitake, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 160 days.

(21) Appl. No.: 17/999,893

(22) PCT Filed: May 27, 2021

(86) PCT No.: PCT/JP2021/020181
§ 371 (c)(1),
(2) Date: Nov. 25, 2022

(87) PCT Pub. No.: WO2022/004207
PCT Pub. Date: Jan. 6, 2022

(65) Prior Publication Data
US 2023/0211623 A1    Jul. 6, 2023

(30) Foreign Application Priority Data

Jun. 30, 2020  (JP) ................................ 2020-112597
Mar. 10, 2021  (JP) ................................ 2021-038269

(51) Int. Cl.
*B41M 5/24*    (2006.01)
(52) U.S. Cl.
CPC .................................. *B41M 5/24* (2013.01)

(58) Field of Classification Search
CPC ............ B41M 5/24; B23K 26/00; B23K 26/03
See application file for complete search history.

(56) References Cited

U.S. PATENT DOCUMENTS

2006/0131289 A1* 6/2006 Jyumonji ........... B23K 26/0853
219/121.65

FOREIGN PATENT DOCUMENTS

| JP | 2006-098104 A | 4/2006 |
| JP | 2012-148309 A | 8/2012 |
| JP | 2015-027681 A | 2/2015 |
| JP | 2017-131931 A | 8/2017 |

OTHER PUBLICATIONS

International Search Report for PCT/JP2021/020181 dated Jul. 20, 2021.
Written Opinion for PCT/JP2021/020181 dated Jul. 20, 2021.

* cited by examiner

*Primary Examiner* — Thinh H Nguyen
(74) *Attorney, Agent, or Firm* — Sughrue Mion, PLLC

(57) ABSTRACT

A laser processing device includes a setting device that sets an irradiation condition of laser light, and a first storage that stores the set irradiation condition. The setting device sets different irradiation conditions respectively for cells included in test cells. A verification device captures an image of the processing pattern and calculates luminance values for the cells respectively. The setting device sets at least one of the irradiation conditions for main processing, based on information on luminance values of the test cells extracted from the luminance values for the cells and based on the irradiation conditions set for the test cells.

12 Claims, 20 Drawing Sheets

| MATERIAL: ALUMINUM | IRRADIATION CONDITION ||||||||||||||||||
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| POWER | 30 | 30 | 30 | 30 | 30 | 30 | 30 | 30 | 30 | 60 | 60 | 60 | 60 | 60 | 60 | 60 | 60 | 60 |
| FREQUENCY | 10 | 10 | 10 | 50 | 50 | 50 | 100 | 100 | 100 | 10 | 10 | 10 | 50 | 50 | 50 | 100 | 100 | 100 |
| PROCESSING SPEED | 10 | 50 | 100 | 10 | 50 | 100 | 10 | 50 | 100 | 10 | 50 | 100 | 10 | 50 | 100 | 10 | 50 | 100 |

FIG.12

| MATERIAL: IRON | IRRADIATION CONDITION ||||||||||||||||||
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| POWER | 60 | 60 | 60 | 60 | 60 | 60 | 60 | 60 | 60 | 90 | 90 | 90 | 90 | 90 | 90 | 90 | 90 | 90 |
| FREQUENCY | 10 | 10 | 10 | 50 | 50 | 50 | 100 | 100 | 100 | 10 | 10 | 10 | 50 | 50 | 50 | 100 | 100 | 100 |
| PROCESSING SPEED | 10 | 50 | 100 | 10 | 50 | 100 | 10 | 50 | 100 | 10 | 50 | 100 | 10 | 50 | 100 | 10 | 50 | 100 |

FIG.13

| MATERIAL: PLASTIC | IRRADIATION CONDITION |||||||||||||||||||
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| POWER | 10 | 10 | 10 | 10 | 10 | 10 | 10 | 10 | 10 | 10 | 20 | 20 | 20 | 20 | 20 | 20 | 20 | 20 |
| FREQUENCY | 10 | 10 | 10 | 50 | 50 | 50 | 100 | 100 | 100 | 10 | 10 | 10 | 50 | 50 | 50 | 100 | 100 | 100 |
| PROCESSING SPEED | 10 | 50 | 100 | 10 | 50 | 100 | 10 | 50 | 100 | 10 | 50 | 100 | 10 | 50 | 100 | 10 | 50 | 100 |

LASER PROCESSING SYSTEM

CROSS REFERENCE TO RELATED APPLICATIONS

This application is a National Stage of International Application No. PCT/JP2021/020181 filed May 27, 2021, which is based on and claims priority to Japanese Patent Application No. 2020-112597 filed Jun. 30, 2020 and Japanese Patent Application No. 2021-038269 filed Mar. 10, 2021, the contents of each of which being herein incorporated by reference in their entireties.

TECHNICAL FIELD

The present disclosure relates to a laser processing system.

BACKGROUND ART

Conventionally, laser processing devices that processes a processing target (workpiece) using laser light are known. One of such laser processing devices is a laser marker used for printing a code readable by a machine (reading device). The laser marker performs marking (hereinafter, also referred to as "printing" or "processing") of characters, figures, and the like on a surface of a marking target (workpiece) using laser light. In order to print a code readable by a reading device, processing needs to be performed under an appropriate irradiation condition (printing condition), but experience and know-how are required in setting the irradiation condition.

Japanese Patent Laying-Open No. 2012-148309 (PTL 1) discloses a laser marker capable of setting an appropriate printing condition without detailed knowledge by repeating setting and sample printing according to guidance.

CITATION LIST

Patent Literature

PTL 1: Japanese Patent Laying-Open No. 2012-148309

SUMMARY OF INVENTION

Technical Problem

According to the technique described in Japanese Patent Laying-Open No. 2012-148309, it is possible to set an appropriate irradiation condition by repeating sample printing according to guidance even without detailed knowledge. However, as this requires repeated trials and takes time and effort for a user, a laser processing system capable of setting an appropriate irradiation condition without taking time and effort is required.

An object of the present disclosure is to provide a laser processing system capable of setting an appropriate irradiation condition without taking time and effort.

Solution to Problem

A laser processing system according to the present disclosure includes: a laser processing device configured to process a processing target in accordance with a processing pattern; and a verification device configured to verify processing by the laser processing device. The processing pattern includes a plurality of cells. The laser processing device includes: a receiving unit configured to receive the processing pattern; a setting unit configured to set an irradiation condition of laser light for each of the cells of the processing pattern received by the receiving unit; a first storage unit configured to store the irradiation condition set by the setting unit for the each of the cells for which the irradiation condition is set; and an irradiation unit configured to irradiate the processing target with laser light based on the irradiation condition set by the setting unit. The setting unit sets, as test cells, a part of the processing pattern received in test processing, and sets different irradiation conditions respectively for the cells included in the test cells. The verification device includes: an imaging unit configured to capture an image of the processing pattern formed on the processing target; and a calculation unit configured to calculate luminance values for the cells respectively based on the image captured by the imaging unit. The setting unit sets at least one of the irradiation conditions for main processing, based on information on luminance values of the test cells extracted from the luminance values for the cells and based on the irradiation conditions set for the test cells.

According to the above disclosure, an appropriate irradiation condition can be set without taking time and effort.

In the above disclosure, the verification device further includes a transmission unit configured to transmit the luminance values for the respective cells calculated by the calculation unit to the laser processing device. The setting unit further extracts information on the luminance values of the test cells based on arrangement information of the test cells and the luminance values for the respective cells received from the verification device.

According to the above disclosure, an appropriate irradiation condition can be set without taking time and effort.

In the above disclosure, the verification device further includes a communication unit configured to communicate with the laser processing device. The calculation unit further extracts information on the luminance values of the test cells based on arrangement information of the test cells and on the calculated luminance values for the respective cells. The communication unit transmits the information on the luminance values of the test cells extracted by the calculation unit to the laser processing device. The setting unit receives the information on the luminance values of the test cells from the verification device.

According to the above disclosure, an appropriate irradiation condition can be set without taking time and effort.

In the above disclosure, the verification device acquires the arrangement information of the test cells from the laser processing device.

According to the above disclosure, it is possible to save time and effort for a user to input the arrangement information of the test cells to the verification device.

In the above disclosure, the verification device further includes a second storage unit. The arrangement information of the test cells is stored in advance in the second storage unit.

According to the above disclosure, it is possible to save time and effort for a user to input the arrangement information of the test cells to the verification device.

In the above disclosure, the information on the luminance values of the test cells includes at least one of information indicating a cell whose luminance is highest in the test cells and information indicating a cell whose luminance is lowest in the test cells. The setting unit sets the irradiation condition for main processing based on the irradiation condition set for the cell specified by the information on the luminance values of the test cells.

According to the above disclosure, an appropriate irradiation condition can be set without taking time and effort.

In the above disclosure, the information on the luminance values of the test cells includes at least one of information indicating two or more cells selected in descending order of luminance in the test cells and information indicating two or more cells selected in ascending order of luminance in the test cells. The setting unit sets the irradiation condition for main processing based on at least one of an average value of the irradiation conditions set for two or more cells whose luminance is high among the cells specified by the information on the luminance values of the test cells and an average value of the irradiation conditions set for two or more cells whose luminance is low among the cells specified by the information on the luminance values of the test cells.

According to the above disclosure, an appropriate irradiation condition can be set without taking time and effort.

In the above disclosure, the receiving unit receives a material of the processing target. The setting unit sets different irradiation conditions respectively for the cells on the test cells in test processing based on the material of the processing target received by the receiving unit.

According to the above disclosure, it is possible to set an irradiation condition appropriate for the material of the processing target without taking time and effort.

In the above disclosure, the laser processing device determines a variation in the luminance values in a region to which the same irradiation condition is set in test processing based on the luminance values for the respective cells calculated by the calculation unit. The setting unit sets the irradiation condition for base treatment based on the information on the luminance values of the test cells and the irradiation conditions set for the test cells when the variation in the luminance values in the region exceeds a threshold value.

According to the above disclosure, it is possible to set an irradiation condition appropriate for base treatment without taking time and effort.

In the above disclosure, the processing pattern is a two-dimensional code.

According to the above disclosure, it is possible to set an appropriate irradiation condition without taking time and effort when printing the two-dimensional code.

In the above disclosure, the test cells are set based on an information unit of the processing pattern.

According to the above disclosure, it is possible to avoid a possibility that information cannot be read by the reading device.

In the above disclosure, the test cells are set in a region of the processing pattern excluding a region used to detect a position of the two-dimensional code.

According to the above disclosure, it is possible to avoid the possibility that position detection of the code is not performed.

Advantageous Effects of Invention

According to the present disclosure, it is possible to provide a laser processing system capable of setting an appropriate irradiation condition without taking time and effort.

BRIEF DESCRIPTION OF DRAWINGS

FIG. 5 is a diagram illustrating an example of a user interface according to the first embodiment.

FIG. 11 is a diagram illustrating irradiation conditions for the test cells in a case where a processing target is aluminum.

FIG. 12 is a diagram illustrating irradiation conditions for the test cells in a case where the processing target is iron.

FIG. 13 is a diagram illustrating irradiation conditions for the test cells in a case where the processing target is plastic.

FIG. 18A: illustrates the first example of a positioning mark and FIG. 18 illustrates the second example of a positioning mark and FIG. 18C illustrates the third example of a positioning mark and FIG. 18D illustrates the fourth example of a positioning mark.

DESCRIPTION OF EMBODIMENTS

Figure 1:
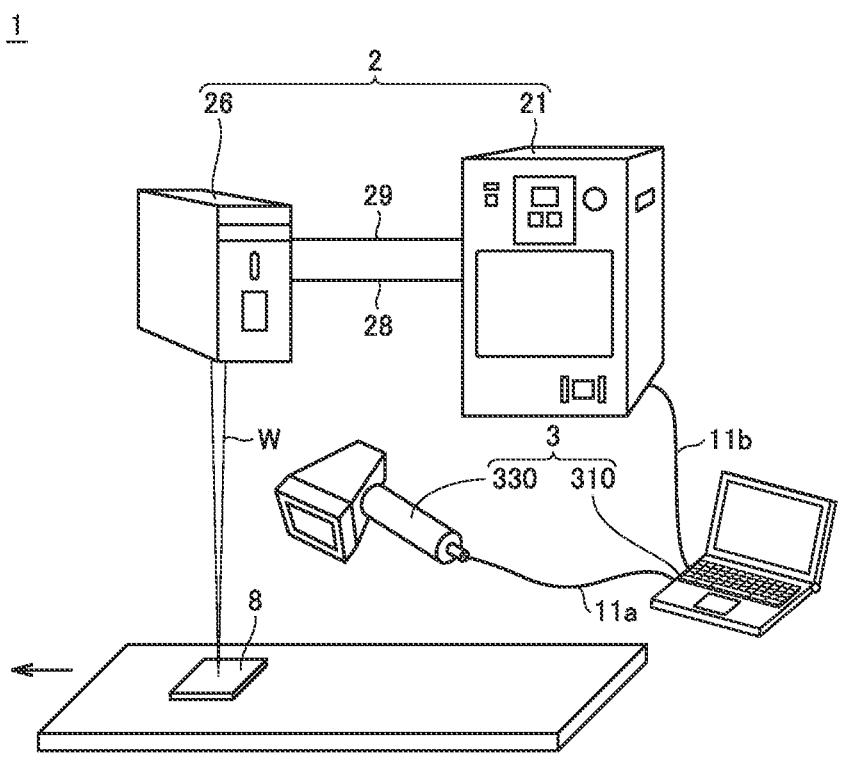
FIG. 1 is a configuration diagram illustrating a schematic configuration of a laser processing system according to a first embodiment.

An embodiment of the present invention will be described in detail with reference to the drawings. The same or corresponding parts in the drawings are denoted by the same reference numerals, and the descriptions thereof will not be repeated.

Application Example

First, an example of a scene to which the present invention is applied will be described mainly with reference to FIGS. 1, 8, and 10. A scene to which the present invention is applied is a scene of setting an irradiation condition of a laser marker 2. In such a scene, first, a user registers a code (processing pattern N in FIG. 8) to be printed on a processing target 8 in laser marker 2. Note that the user can also use a code registered in advance, and in this case, the user selects a code to be printed from the registered codes. Laser marker 2 sets cells included in received processing pattern N (for example, cells "1" to "18" in FIG. 10) as the test cells. Laser marker 2 sets different irradiation conditions respectively for the cells included in the test cells and performs test processing. A verification device 3 calculates a luminance value for each of cells S of processing pattern N formed by the test processing.

The test processing is trial processing performed before main processing, and includes test base treatment and test processing treatment. The main processing includes processing treatment of forming a code to be printed on processing target 8, and base treatment of irradiating all of a surface of a print target area with laser light before processing treatment. In general, the higher the luminance value is, the whiter cell S is, and the lower the luminance value is, the blacker cell S is. Further, the clearer the black-and-white contrast is, the more easily the code can be read by the reading device. Therefore, a laser processing system 1 extracts information on the luminance values of the test cells based on the calculated luminance value for each of cells S, and specifies at least one of an irradiation condition suitable for the white cell (hereinafter, also referred to as "white cell") and an irradiation condition suitable for the black cell (hereinafter, also referred to as "black cell") based on the extracted information. Laser processing system 1 sets the specified irradiation condition as an irradiation condition of laser light W for main processing. The irradiation condition of laser light W for main processing may include only the irradiation condition for actual processing treatment, or may include the irradiation condition for actual processing treatment and the irradiation condition for actual base treatment. As a result, it is possible to set an irradiation condition suitable for printing a code that can be read by a reading device by one test processing. Therefore, according to laser processing system 1, it is possible to set an appropriate irradiation condition without taking time and effort.

Laser processing system 1 includes laser marker 2 and verification device 3. The luminance value for each of cells S is calculated by verification device 3. The information on the luminance values of the test cells is extracted by laser marker 2 or verification device 3 based on the luminance value for each of cells S calculated by verification device 3. A first embodiment is an example of a case where laser marker 2 extracts the information on the luminance values of the test cells, and a second embodiment and a third embodiment are examples of a case where verification device 3 extracts the information on the luminance values of the test cells.

Hereinafter, a laser marker will be described as an example of the laser processing device. Note that the laser marker according to the embodiments may have a function of performing processing such as drilling, peeling, and cutting, in addition to the function of marking characters and symbols.

First Embodiment

<Schematic Configuration of Laser Processing System>

FIG. 1 is a configuration diagram illustrating a schematic configuration of a laser processing system according to the first embodiment. Referring to FIG. 1, laser processing system 1 includes laser marker 2 and verification device 3. Laser marker 2 includes a controller 21 and a marking head 26 (corresponding to an "irradiation unit").

Controller 21 controls an operation of marking head 26. Although described in detail later, controller 21 includes a laser oscillator that oscillates laser light W.

Marking head 26 irradiates processing target 8 with laser light W under control of controller 21. Marking head 26 is connected to an oscillator in controller 21 by an optical fiber 28. Further, marking head 26 is connected to controller 21 by a communication cable 29. Specifically, marking head 26 is connected to a control board in controller 21 by communication cable 29. Note that a connection mode between controller 21 and marking head 26 is the same as the conventional configuration, and thus, will not be described in detail here.

Verification device 3 verifies processing by laser marker 2. Verification device 3 includes an imaging unit 330 and a control unit 310 (corresponding to a "calculation unit"). Imaging unit 330 and control unit 310 are connected by a communication cable 11a. Imaging unit 330 captures an image of processing pattern N formed on processing target 8 (see FIG. 8) and transmits the captured image to control unit 310. Control unit 310 calculates a luminance value for each of cells S of processing pattern N (see FIG. 9) on the basis of the image captured by imaging unit 330. The calculated luminance value for each of cells S is transmitted to laser marker 2 (specifically, controller 21). Verification device 3 is connected to laser marker 2 (specifically, controller 21) by a communication cable 11b. Laser marker 2 (specifically, controller 21) extracts information on the luminance values of the test cells (cells "1" to "18" in FIG. 10) based on the received luminance value for each of cells S, and sets the irradiation condition of laser light W for main processing based on the extracted information on the luminance values of the test cells and the irradiation conditions set for the test cells.

When laser marker 2 includes a camera unit, imaging unit 330 may be substituted by the camera unit included in laser marker 2. In such a case, the camera unit captures an image of processing pattern N formed on processing target 8, and transmits the captured image to control unit 310. The camera unit and control unit 310 are connected by a communication cable. Control unit 310 calculates a luminance value for each of cells S of processing pattern N based on the captured image, and transmits the calculated luminance value for each of cells S to controller 21. Control unit 310 is connected to controller 21 by communication cable 11b. Controller 21 extracts information on the luminance values of the test cells based on the received luminance value for each of cells S, and sets the irradiation condition of laser light W for main processing based on the extracted information on the luminance values of the test cells and the irradiation conditions set in the test cells.

Furthermore, control unit 310 may be integrated with imaging unit 330 (or the camera unit). In a case where control unit 310 is integrated with imaging unit 330 (or the camera unit), imaging unit 330 (or the camera unit) captures an image of processing pattern N formed on processing target 8, calculates a luminance value for each of cells S of processing pattern N on the basis of the captured image, and transmits the calculated luminance value for each of cells S to controller 21. Imaging unit 330 (or the camera unit) is connected to controller 21 by a communication cable. Controller 21 extracts information on the luminance values of the test cells based on the received luminance value for each of cells S, and sets the irradiation condition of laser light W for main processing based on the extracted information on the luminance values of the test cells and the irradiation conditions set in the test cells.

In addition, controller 21 may be substituted for control unit 310. In a case where controller 21 is substituted for control unit 310, imaging unit 330 (or the camera unit) captures an image of processing pattern N formed on processing target 8 and transmits the captured image to controller 21. Imaging unit 330 (or the camera unit) is connected to controller 21 by a communication cable. Controller 21 receives an image captured by imaging unit 330 (or the camera unit) and calculates a luminance value for each of cells S of processing pattern N based on the captured image. Controller 21 extracts information on the luminance values of the test cells based on the calculated luminance value for each of cells S, and sets the irradiation condition of laser light W for main processing based on the extracted information on the luminance values of the test cells and the irradiation conditions set in the test cells.

<Detailed Configuration of Laser Processing System 1>

Figure 2:
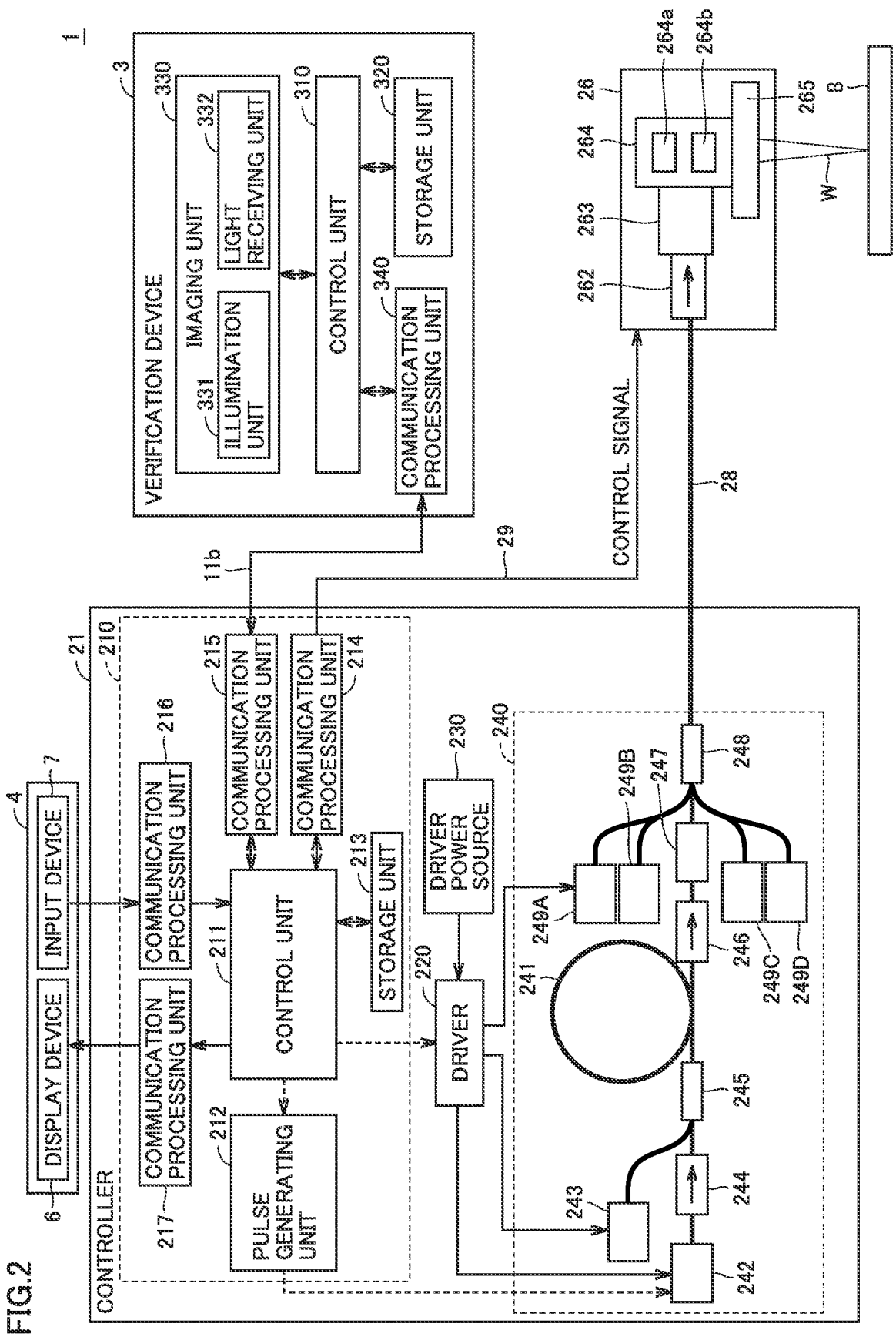
FIG. 2 is a configuration diagram illustrating a configuration of the laser processing system according to the first embodiment in more detail.

FIG. 2 is a configuration diagram illustrating a configuration of the laser processing system according to the first embodiment in more detail. Referring to FIGS. 1 and 2, laser processing system 1 includes controller 21, marking head 26, and verification device 3 as described above.

Controller 21 includes a laser oscillator 240, a control board 210, a driver 220, and a driver power source 230. A setting device 4 including a display device 6 and an input device 7 can be connected to controller 21. Display device 6 and input device 7 are used in an aspect in which a user changes setting contents in controller 21.

(Controller 21)

(1) Laser Oscillator 240

Laser oscillator 240 will be described as follows. Laser oscillator 240 includes an optical fiber 241, semiconductor lasers 242, 243, 249A to 249D, isolators 244, 246, couplers 245, 248, and a bandpass filter 247.

Semiconductor laser 242 is a seed light source that emits seed light. Semiconductor laser 242 is driven by driver 220 to emit pulsed seed light.

Isolator 244 transmits light only in one direction and blocks light incident in a direction opposite to the light. Specifically, isolator 244 passes seed light emitted from Semiconductor laser 242 and blocks return light from optical fiber 241. As a result, damage to semiconductor laser 242 can be prevented.

The semiconductor laser 243 is an excitation light source that emits excitation light for exciting a rare earth element added to a core of optical fiber 241.

Coupler 245 couples the seed light from semiconductor laser 242 and the excitation light from semiconductor laser 243 to enter optical fiber 241.

The excitation light entering optical fiber 241 from semiconductor laser 243 via coupler 245 is absorbed by the rare earth element included in the core of optical fiber 241. As a result, the rare earth element is excited, and an inverted distribution state is obtained. In this state, when seed light from semiconductor laser 242 enters the core of optical fiber 241, stimulated emission occurs. The seed light (pulse light) is amplified by this stimulated emission. That is, by seed light and excitation light entering a fiber amplifier constituted by optical fiber 241, the seed light is amplified.

Isolator 246 passes the pulsed light output from optical fiber 241 and blocks the light returning to optical fiber 241.

Bandpass filter 247 is configured to pass light of a predetermined wavelength band. The "predetermined wavelength band" specifically means a wavelength band including a peak wavelength of the pulsed light output from optical fiber 241. When spontaneous emission light is emitted from optical fiber 241, the spontaneous emission light is removed by bandpass filter 247.

The laser light having passed through bandpass filter 247 enters optical fiber 28 provided for transmitting the laser light via coupler 248. Semiconductor lasers 249A to 249D emit excitation light in order to amplify the laser light having passed through bandpass filter 247 in optical fiber 28. That is, optical fiber 28 constitutes a fiber amplifier by combining coupler 248 and an isolator 262 to be described later, similarly to a fiber amplifier constituted by coupler 245, optical fiber 241, and an isolator 246.

Coupler 248 couples the pulsed light having passed through bandpass filter 247 and the light from semiconductor lasers 249A to 249D and causes the light to enter optical fiber 28.

Note that the configuration of laser oscillator 240 illustrated in FIG. 2 is an example, and the present invention is not limited thereto. For example, laser oscillator 240 may not include bandpass filter 247 as long as laser light in a predetermined wavelength band can be obtained.

(2) Control Board 210

Control board 210 includes a control unit 211 (corresponding to a "setting unit"), a pulse generating unit 212, a storage unit 213 (corresponding to a "first storage unit"), and communication processing units 214, 215, 216, and 217.

Control unit 211 controls an operation of controller 21 as a whole by controlling pulse generating unit 212 and driver 220. Specifically, control unit 211 controls the operation of controller 21 as a whole by executing an operating system and an application program stored in storage unit 213. As a result, processing target 8 is irradiated with laser light W from marking head 26.

Pulse generating unit 212 generates an electric signal having a predetermined repetition frequency and a predetermined pulse width. Pulse generating unit 212 outputs an electric signal or stops outputting the electric signal under the control of control unit 211. The electric signal from pulse generating unit 212 is supplied to semiconductor laser 242.

Storage unit 213 stores various data in addition to the operating system and the application program.

Communication processing unit 214 is an interface for communicating with marking head 26. Control unit 211 transmits a control signal to marking head 26 via communication processing unit 214 and communication cable 29.

Communication processing unit 215 is an interface for communicating with verification device 3. Control unit 211 receives the luminance value for each of cells S (see FIG. 9) transmitted from verification device 3 via communication cable 11*b* and a communication processing unit 340 (corresponding to the "transmission unit").

Communication processing unit 216 (corresponding to "receiving unit") receives an input from input device 7. Input device 7 is various pointing devices (for example, a mouse, a touch pad, or the like), a keyboard, or the like. Communication processing unit 216 notifies control unit 211 of the received input.

Communication processing unit 217 transmits image data generated by control unit 211 to display device 6. In this case, display device 6 displays an image (user interface) based on the image data. An example of the user interface displayed on display device 6 will be described later with reference to FIG. 5.

(3) Driver 220 and Driver Power Source 230

Driver power source 230 supplies power to driver 220. Thus, driver 220 supplies a driving current to semiconductor lasers 242, 243, 249A to 249D. Each of semiconductor lasers 242, 243, 249A to 249D oscillates by being supplied with a driving current. The driving current supplied to semiconductor laser 242 is modulated by an electric signal from pulse generating unit 212. As a result, semiconductor laser 242 performs pulse oscillation, and outputs pulsed light having a predetermined repetition frequency and a predetermined pulse width as seed light. On the other hand, to each of semiconductor lasers 243, 249A to 249D, a continuous driving current is supplied by driver 220. As a result, each of semiconductor lasers 243, 249A to 249D continuously oscillates and outputs continuous light as excitation light.

(Marking Head 26)

Marking head 26 includes isolator 262, a collimator lens 263, a galvano mirror unit 264 (a galvano mirror 264a in X direction and a galvano mirror 264b in Y direction), and a condenser lens 265. Isolator 262 passes the pulsed light output from optical fiber 28 and blocks the light returning to optical fiber 28. The pulsed light having passed through isolator 262 is output to the atmosphere from collimator lens 263 attached to isolator 262 and is incident on galvano mirror unit 264. Condenser lens 265 condenses laser light W incident on galvano mirror unit 264. Galvano mirror unit 264 scans laser light W in at least one of a direction of a first axis (specifically, an axis parallel to an arrow in FIG. 1) and a direction of a second axis orthogonal to the first axis.

(Verification Device 3)

Verification device 3 includes control unit 310, a storage unit 320 (corresponding to a "second storage unit"), imaging unit 330, and communication processing unit 340.

Control unit 310 controls an operation of verification device 3 as a whole by executing the operating system and the application program stored in storage unit 320.

Storage unit 320 stores various data in addition to the operating system and the application program.

Imaging unit 330 includes an illumination unit 331 and a light receiving unit 332. Illumination unit 331 is turned on in accordance with an imaging instruction from control unit 310. Processing target 8 is irradiated with light from illumination unit 331, and reflected light is received by light receiving unit 332. Imaging unit 330 forms an image on the basis of the reflected light received by light receiving unit 332. As a result, an image of processing pattern N (see FIG. 8) formed on processing target 8 is formed. Imaging unit 330 transmits the captured image to control unit 310.

Control unit 310 calculates a luminance value for each of cells S of processing pattern N (see FIG. 9) on the basis of the captured image received from imaging unit 330.

Communication processing unit 340 is an interface for communicating with controller 21. Communication processing unit 340 transmits the luminance value for each of cells S calculated by control unit 310 to laser marker 2 (specifically, controller 21) through communication cable 11b. The luminance value for each of cells S transmitted to laser marker 2 (specifically, controller 21) is referred when controller 21 (specifically, control unit 211) sets the irradiation condition of laser light W for main processing.

Note that verification device 3 may be a code verification machine that verifies a code in accordance with Direct Part Mark Quality Guideline (ISO 29158) or the like, or may be a camera of an image processing system adopted in a process at a manufacturing site. If verification device 3 is a code verification machine, it is possible to set an optimum irradiation condition in one printing and one verification, and it is also possible to ensure quality according to ISO 29158 or the like. In addition, when verification device 3 is a camera of an image processing system, it is possible to acquire irradiation conditions suitable for white printing and black printing respectively only by imaging a cell with high luminance and a cell with low luminance with the camera of the image processing system without specially preparing a code verification machine.

(Hardware Configuration of Control Board 210 and Verification Device 3)

Figure 3:
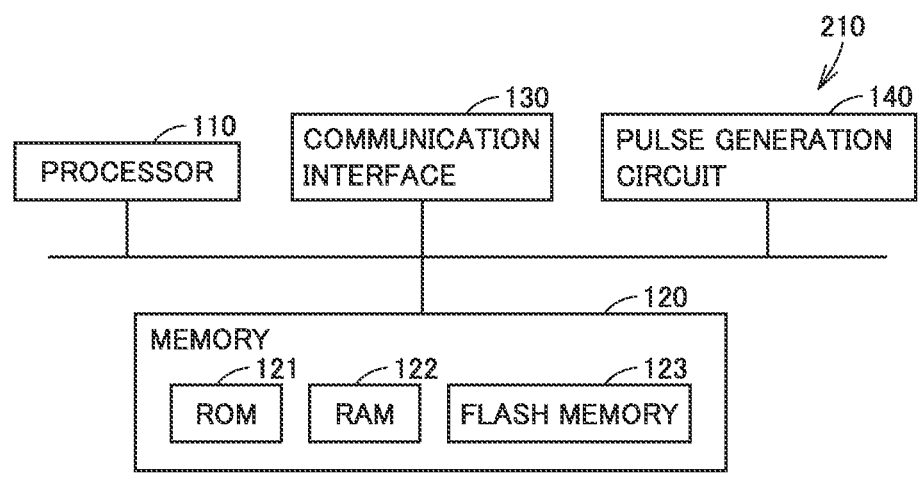
FIG. 3 is a configuration diagram illustrating hardware included in a control board according to the first embodiment.

FIG. 3 is a configuration diagram illustrating hardware included in the control board according to the first embodiment. Referring to FIG. 3, control board 210 includes a processor 110, a memory 120, a communication interface 130, and a pulse generation circuit 140.

Memory 120 includes, for example, a read only memory (ROM) 121, a random access memory (RAM) 122, and a flash memory 123. Flash memory 123 stores an operating system, an application program, and various data described above. Memory 120 corresponds to storage unit 213 illustrated in FIG. 2.

Processor 110 controls an operation of controller 21 as a whole. Note that control unit 211 illustrated in FIG. 2 is implemented by processor 110 executing the operating system and the application program stored in memory 120. When the application program is executed, various kinds of data stored in memory 120 are referred.

Communication interface 130 is for communicating with an external device (for example, verification device 3, marking head 26, display device 6, and input device 7). Communication interface 130 corresponds to communication processing units 214, 215, 216, and 217 in FIG. 2.

Pulse generation circuit 140 corresponds to pulse generating unit 212 in FIG. 2. That is, pulse generation circuit 140 generates an electric signal having a predetermined repetition frequency and a predetermined pulse width on the basis of a command from processor 110.

Figure 4:
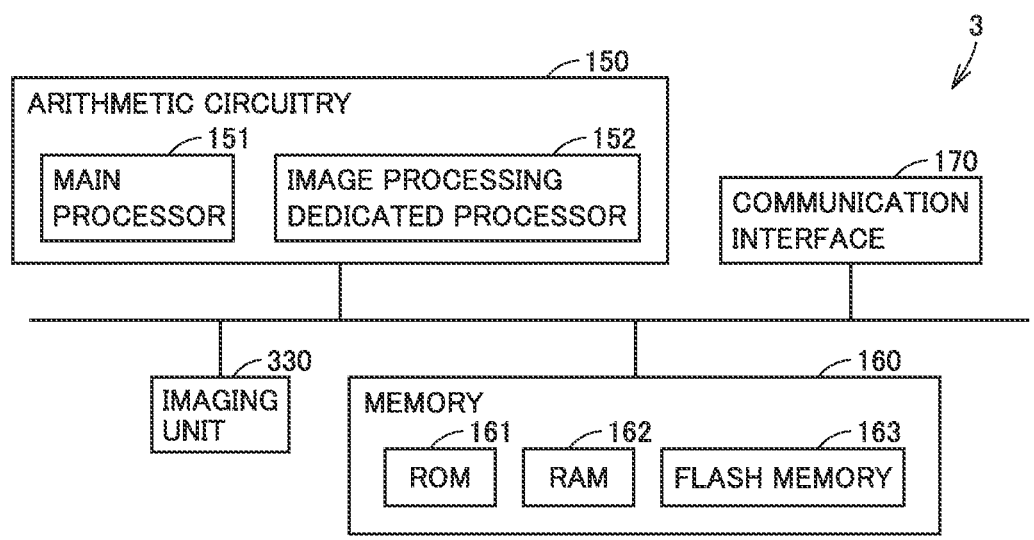
FIG. 4 is a configuration diagram illustrating hardware included in a verification device according to the first embodiment.

FIG. 4 is a configuration diagram illustrating hardware included in the verification device according to the first embodiment. Referring to FIG. 4, verification device 3 includes an arithmetic circuitry 150, a memory 160, a communication interface 170, and imaging unit 330.

Memory 160 includes, for example, a ROM 161, a RAM 162, and a flash memory 163. Flash memory 163 stores an operating system, an application program, and various data described above. Memory 160 corresponds to storage unit 320 illustrated in FIG. 2. Note that memory 160 may include a hard disk drive (HDD).

Arithmetic circuitry 150 includes a main processor 151 and an image processing dedicated processor 152. Control unit 310 illustrated in FIG. 2 is implemented by arithmetic circuitry 150 executing the operating system and the application program stored in memory 160. When the application program is executed, various kinds of data stored in memory 160 are referred.

Main processor 151 controls the operation of verification device 3 as a whole. Image processing dedicated processor 152 performs preprocessing an image captured by imaging unit 330, and calculates a luminance value for each of cells S (see FIG. 9). Note that an application specific integrated circuit (ASIC) for performing image processing may be provided instead of image processing dedicated processor 152.

Communication interface 170 is for communicating with controller 21. The communication interface corresponds to communication processing unit 340 in FIG. 2.

Note that the hardware configurations illustrated in FIGS. 3 and 4 are merely examples, and the present invention is not limited thereto.

<Pre-Registration>

Figure 5:
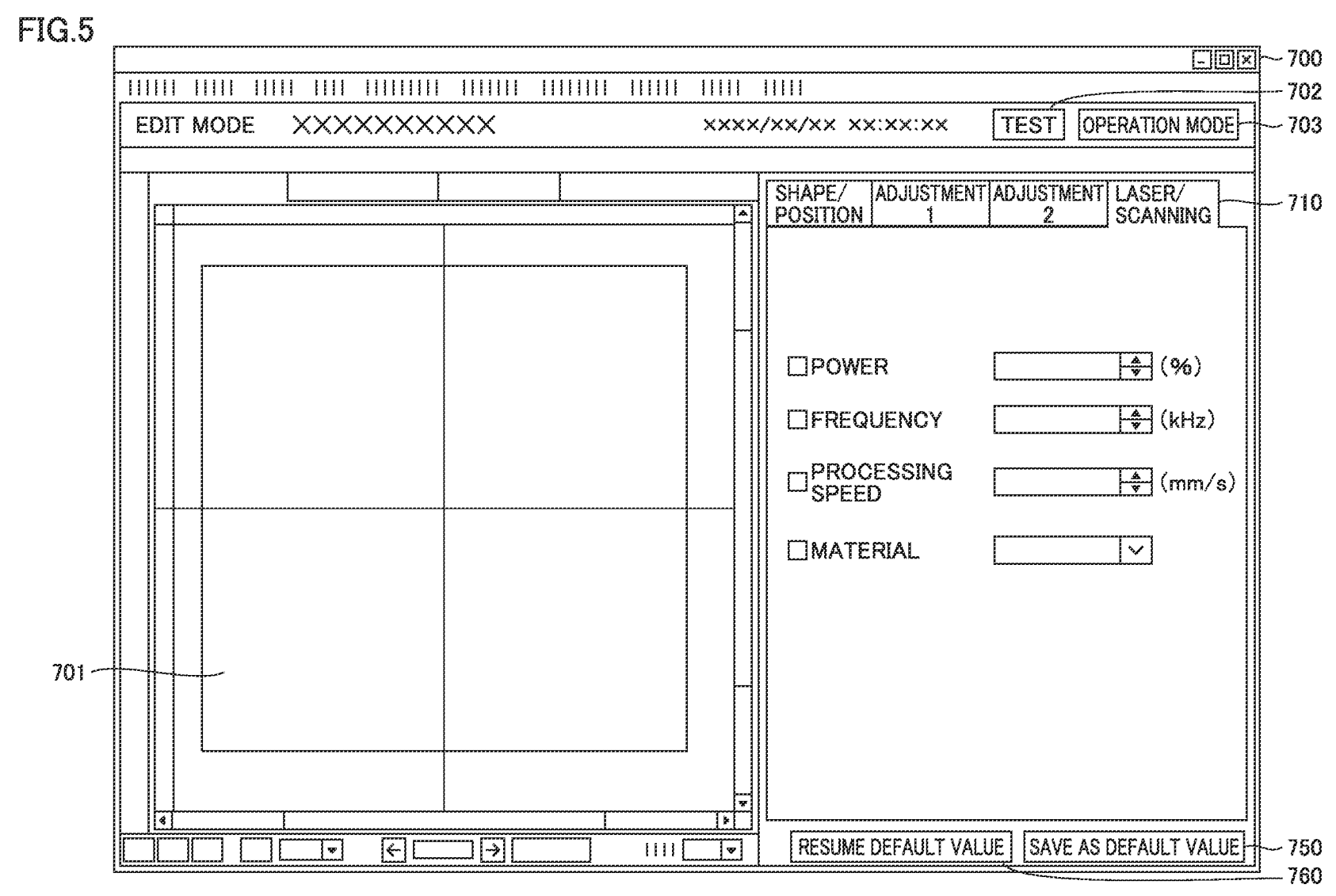

A user interface displayed on display device 6 will be described with reference to FIGS. 2 and 5. FIG. 5 is a diagram illustrating an example of the user interface according to the first embodiment. A user interface 700 is displayed on display device 6 by control unit 211 executing the application program stored in storage unit 213. The user's input operation using input device 7 performed on user interface 700 is received by communication processing unit 216, and control unit 211 is notified of contents of the received operation.

Control unit 211 can switch screen modes according to the user's operation. FIG. 5 illustrates a screen in an edit mode used for creating and editing marking data. When a user operation of clicking a button 703 is received, control unit 211 switches the screen from the screen in the edit mode to a screen in an operation mode used when marking (processing) is actually performed. Note that control unit 211 switches the screen in the operation mode to the screen in the edit mode by receiving a user operation of clicking a button displayed on the screen in the operation mode.

When a user operation of clicking a button 702 is received, control unit 211 causes display device 6 to display a test marking screen. As a result, the user can confirm created and edited marking data on display device 6.

Figure 8:
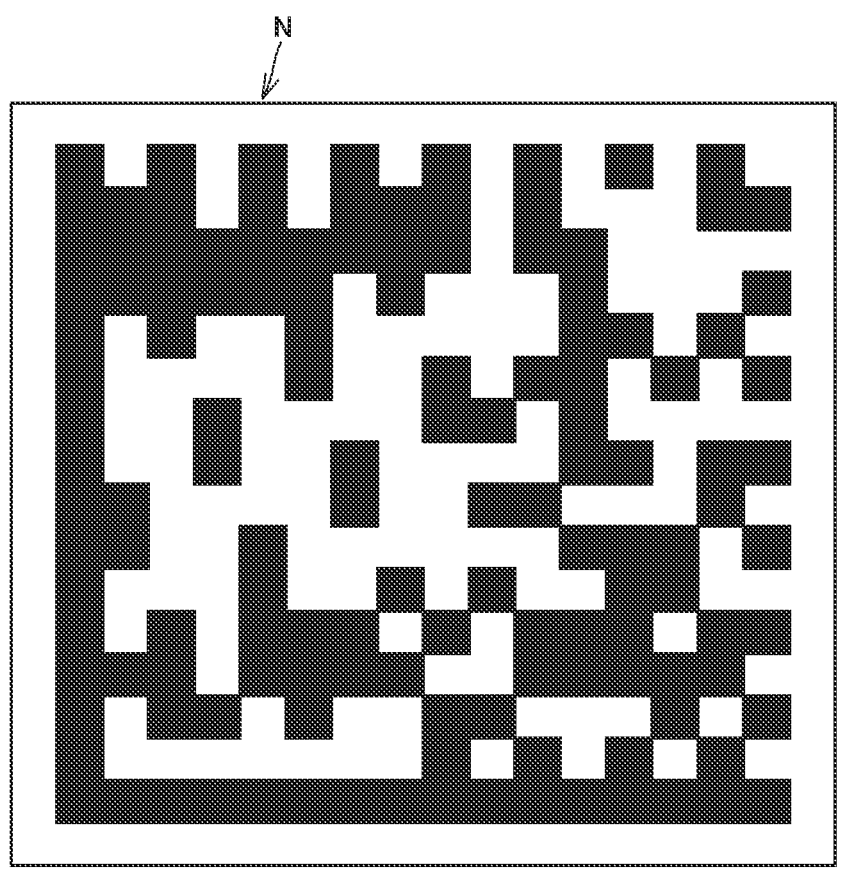
FIG. 8 is a diagram illustrating a processing pattern input to a drawing region.

Control unit 211 receives an input of a pattern to be marked, such as characters, figures, and symbols to be marked (for example, processing pattern N illustrated in FIG. 8). That is, control unit 211 operates as a part of a receiving unit that receives processing pattern N. In the first embodiment, the processing pattern is, for example, a pattern readable by a reading device. The processing pattern is drawn by the user using a drawing region 701. In drawing region 701, a coordinate system including an X axis and a Y axis is set. Control unit 211 specifies the processing pattern input by the user in the coordinate system. That is, control unit 211 receives the processing pattern input by the user as position information.

In a state where a laser/scanning tab 710 is selected, control unit 211 receives setting of an irradiation condition of laser light and a material of processing target 8. Laser/scanning tab 710 includes fields for inputting output power of the laser light, a frequency of the laser light, a processing speed, and a material of processing target 8. When numerical values are input in respective fields of "power", "frequency", and "processing speed", control unit 211 sets the input numerical values as the output power of the laser light, the frequency of the laser light, and the processing speed. When the material is selected in the field of "material", control unit 211 sets the selected material as the material of processing target 8. The irradiation condition of the laser light may include other elements (for example, a pulse shape, a number of times of scanning, an interval of irradiation of laser light, and the like), in addition to the output power of the laser light, the frequency of the laser light, and the processing speed.

When a user operation of clicking a button 750 is received, control unit 211 stores a content (setting content) input by the user as a default value. When a user operation of clicking a button 760 is received, control unit 211 returns the content (setting content) input by the user to a default value.

Note that user interface 700 illustrated in FIG. 5 is an example, and the present invention is not limited thereto. For example, the field for inputting the material of processing target 8 may be provided in a position other than laser/scanning tab 710. In addition, a field for inputting a type of the code (for example, a QR code (registered trademark), DataMatrix (registered trademark), and the like) may be provided in user interface 700. Furthermore, control unit 211 can also write the content (setting content) input by the user, for example, in a file format to an external memory, or transmit the content to an external device. Accordingly, the setting content can be transferred to other laser markers other than laser marker 2 (see FIG. 1).

Laser marker 2 processes processing target 8 by irradiating processing target 8 with laser light based on processing pattern N and the irradiation condition of the laser light input by the user using user interface 700. In order to print a code readable by a reading device, processing needs to be performed under an appropriate irradiation condition, but experience and know-how are required for setting such an irradiation condition. In addition, even a user having experience and know-how needs repeated trials to set an irradiation condition, which takes time and effort. Therefore, laser marker 2 sets cells included in the received processing pattern N as test cells. Laser marker 2 sets different irradiation conditions respectively for the cells included in the test cells and performs test processing. A verification device 3 calculates a luminance value for each of cells S of processing pattern N formed by the test processing. In general, the higher the luminance value is, the whiter cell S is, and the lower the luminance value is, the blacker cell S is. Further, the clearer the black-and-white contrast is, the more easily the code can be read by the reading device. Therefore, laser marker 2 extracts information on the luminance values of the test cells based on the luminance value for each of cells S calculated by verification device 3, and sets the irradiation condition of laser light W for main processing based on the extracted information. As a result, an optimum irradiation condition can be set in one test processing. Therefore, according to laser processing system 1, it is possible to set an appropriate irradiation condition without taking time and effort. Hereinafter, the setting of the irradiation condition of the laser light by laser processing system 1 will be described in detail.

<Setting of Irradiation Condition of Laser Light>

Figure 6:
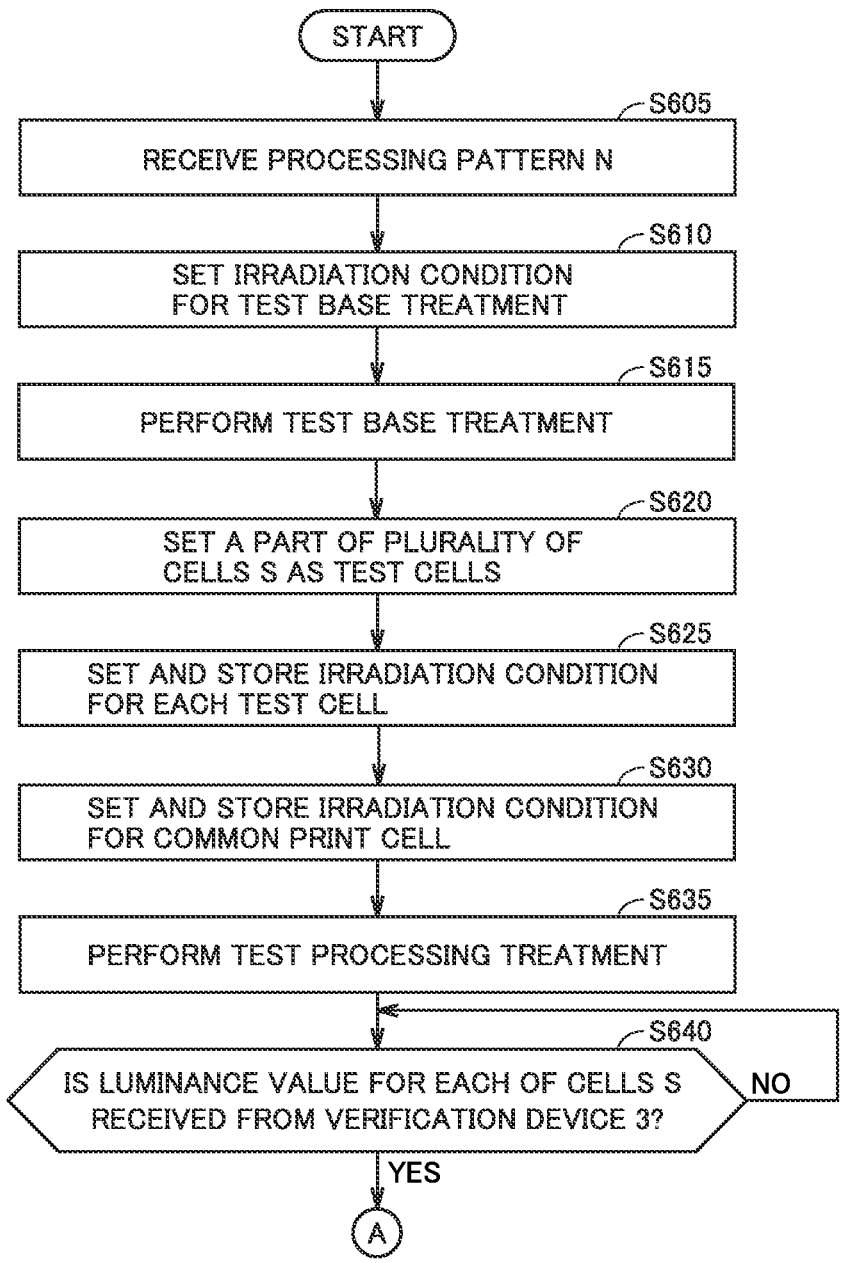
FIG. 6 is a flowchart illustrating an example of processing of a controller according to the first embodiment.
Figure 7:
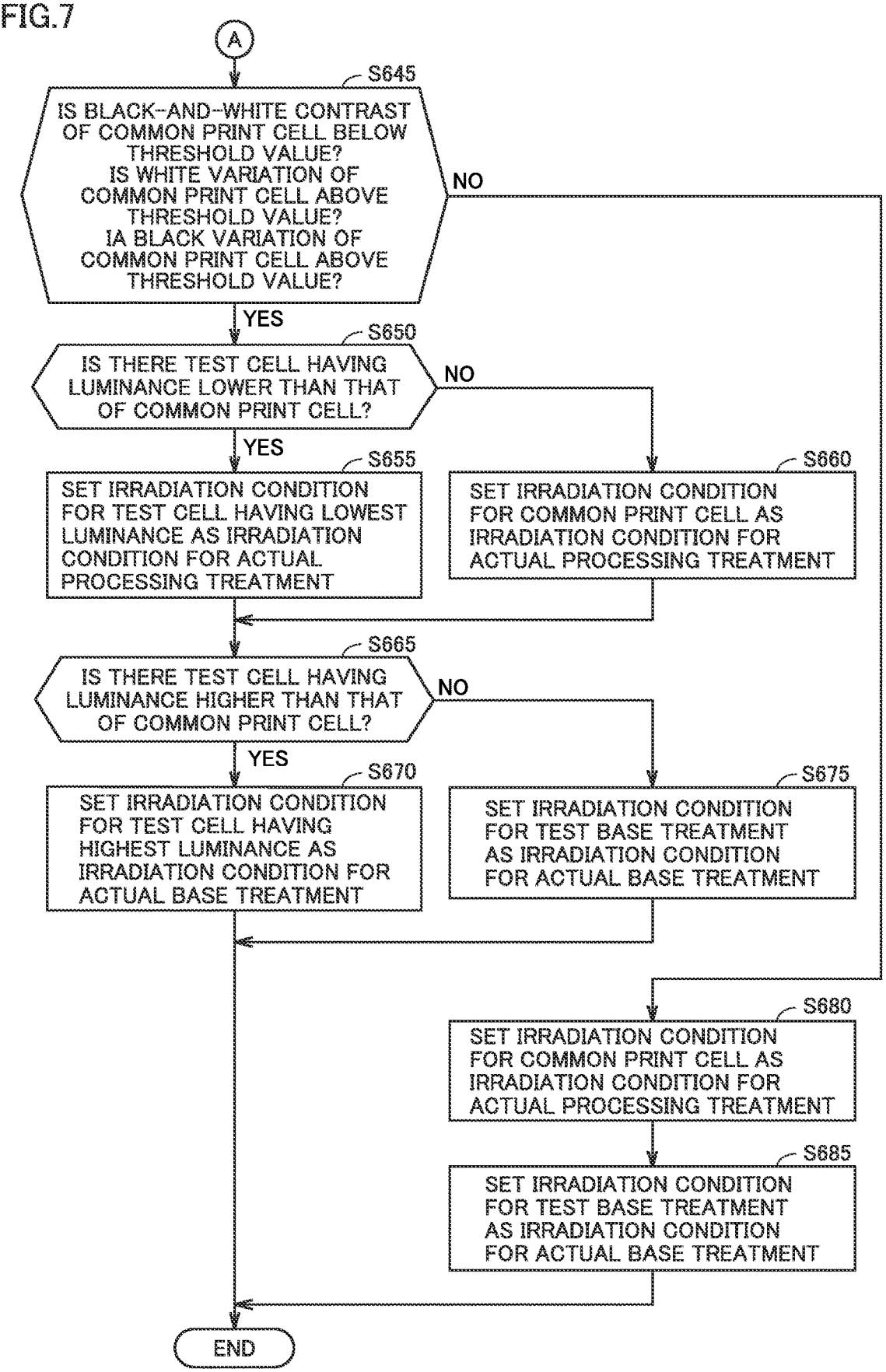
FIG. 7 is a flowchart illustrating an example of the processing of the controller according to the first embodiment.

With reference to FIGS. 1, 2, and 6 to 14, a method of setting an irradiation condition of laser light by laser processing system 1 will be described. Hereinafter, a method of setting the irradiation condition of the laser light will be described using a case where black printing is performed on a white background as an example. FIGS. 6 and 7 are flowcharts illustrating examples of the processing of the controller according to the first embodiment. The processing illustrated in FIGS. 6 and 7 is realized by control unit 211 executing the application program stored in storage unit 213. First, control unit 211 receives processing pattern N via communication processing unit 216 (step S605).

Figure 9:
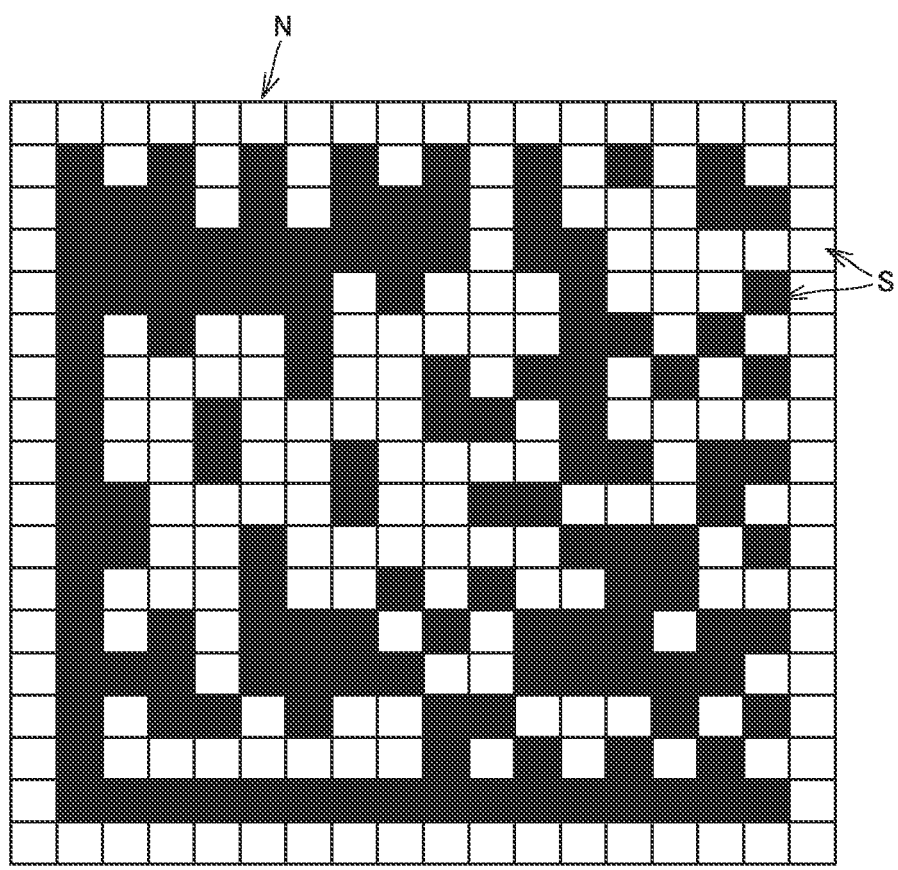
FIG. 9 is a diagram showing that the processing pattern input to the drawing region includes a plurality of cells.

Here, the processing of step S605 will be specifically described with reference to FIGS. 2, 5, 8, and 9. FIG. 8 is a diagram illustrating a processing pattern input to the drawing region. FIG. 9 is a diagram showing that the processing pattern input to the drawing region includes a plurality of cells. Processing pattern N is input to drawing region 701 by the user and received by communication processing unit 216. Note that, in a case where a code registered in advance is used, a code to be printed is selected by the user from registered codes, and is received by communication processing unit 216. Communication processing unit 216 transmits received processing pattern N to control unit 211. When processing pattern N from communication processing unit 216 is received, control unit 211 receives received processing pattern N as a group of a plurality of cells S as illustrated in FIG. 9, and allocates a cell number to each of cells S according to a predetermined rule. As a result, a position of each of cells S in processing pattern N is specified by the cell number. In the first embodiment, processing pattern N is a two-dimensional code. Examples of the two-dimensional code include a QR code and DataMatrix. FIGS. 8 and 9 illustrate DataMatrix as an example of the two-dimensional code.

Referring to FIG. 6 again, control unit 211 sets an irradiation condition for test base treatment (step S610). Irradiation conditions for the test base treatment are predetermined one by one for respective materials of processing target 8, and are stored in storage unit 213. The irradiation conditions for the base treatment may include a condition that base treatment is not performed.

Next, control unit 211 performs test base treatment (step S615). Control unit 211 irradiates at least all of a surface of a test print target area with the laser light under the irradiation condition set in step S610. Note that, in step S610, if the condition that the base treatment is not performed is set as the irradiation condition for base treatment, control unit 211 does not perform the processing of step S615.

Next, control unit 211 sets test cells (step S620). Specifically, control unit 211 sets some of the plurality of divided cells S in received processing pattern N as test cells.

Here, the test cells will be described with reference to FIG. 10. FIG. 10 is a diagram for illustration of the test cells. In FIG. 10, in order to distinguish between the test cells and cells S other than the test cells, numbers "1" to "18" are assigned to the test cells.

Figure 10:
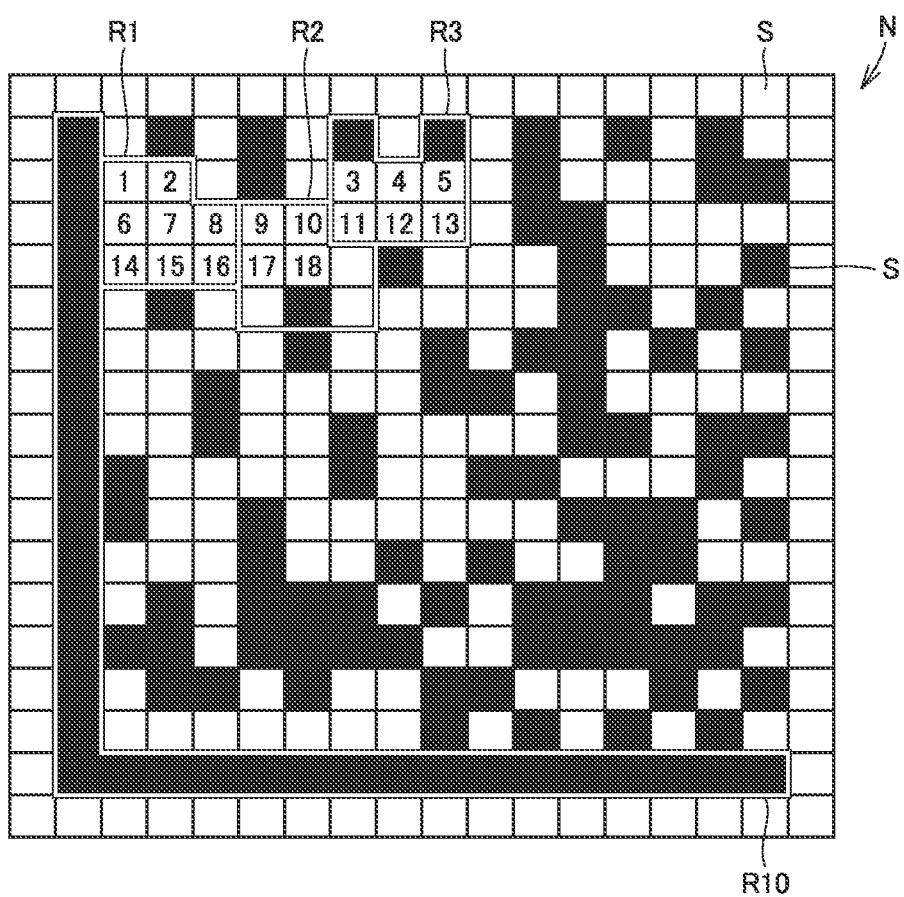
FIG. 10 is a diagram for illustration of test cells.

As illustrated in FIG. 10, processing pattern N includes a black cell S and a white cell S. When processing pattern N is a two-dimensional code, 8 cells S constitute one piece of information. Hereinafter, a cluster of 8 cells S constituting one piece of information is also referred to as an "information unit". Such an information unit is, for example, an information unit R1, an information unit R2, an information unit R3, or the like. Although only three information units are illustrated in FIG. 10, all cells S constituting processing pattern N are actually divided into information units.

In the two-dimensional code, the content of information is specified from an arrangement of black cell S and white cell S for each information unit. That is, if the arrangement of black cell S and white cell S for each information unit is changed, there is a possibility that information cannot be read by the reading device. Cells S selected as the test cells are irradiated with laser light in step S635 described later. Therefore, the test cells are selected and set based on the information unit of the processing pattern so that the reading device can read the information. More specifically, the test cells are set so that the arrangement of black cell S and white cell S for each information unit does not change from that of processing pattern N received in step S605.

In addition, the two-dimensional code is provided with a region R10 and the like used to detect the position of the code. If the arrangement of black cell S and white cell S in this region is changed, there is a possibility that a position of the code cannot be detected. Therefore, the test cells are selected and set from a region excluding a region used to detect the position of the two-dimensional code in the processing pattern.

Referring to FIG. 6 again, control unit 211 sets the irradiation condition for each of cells S set as the test cells in step S620, and stores the set irradiation condition for each of cells S for which the irradiation condition is set in storage unit 213 (step S625). As an example, control unit 211 stores the cell numbers of cells S selected as the test cells and the irradiation conditions set for cells S specified by the cell numbers in storage unit 213 in association with each other. The cell numbers of cells S selected as the test cells are an example of "arrangement information of the test cells".

The setting of the irradiation condition in step S625 will be described with reference to FIGS. 2, 5, 10, and 11 to 13. FIG. 11 is a diagram illustrating irradiation conditions for the test cells in a case where the processing target is aluminum. FIG. 12 is a diagram illustrating irradiation conditions for the test cells in a case where the processing target is iron. FIG. 13 is a diagram illustrating irradiation conditions for the test cells in a case where the processing target is plastic.

The irradiation conditions illustrated in FIGS. 11 to 13 are stored in storage unit 213. Even when the laser light is emitted under the same irradiation condition, the processing condition (for example, the color of processing target 8) varies depending on the material of processing target 8. Therefore, in laser processing system 1, the irradiation conditions for the test cells is stored for each material of processing target 8. As illustrated in FIGS. 11 to 13, 18 kinds of irradiation conditions for the test cells are prepared for one material. Each irradiation condition (irradiation conditions 1 to 18) includes "power", "frequency", and "processing speed". The processing condition (for example, the color of processing target 8) also varies depending on the irradiation condition of the laser light. That is, the color of processing target 8 is determined by the combination of the material of processing target 8 and the irradiation condition of the laser light. The irradiation condition of the laser light may include other elements (for example, a pulse shape, a number of times of scanning, an interval of irradiation of laser light, and the like) in addition to "power", "frequency", and "processing speed".

When the user selects the material of processing target 8 on user interface 700, the selected material of processing target 8 is received by communication processing unit 216 and transmitted to control unit 211. Control unit 211 specifies irradiation conditions for the test cells corresponding to the material received from communication processing unit 216 from among the irradiation conditions for the test cells stored in storage unit 213, and allocates the specified irradiation conditions (irradiation conditions 1 to 18) to respective cells S of the test cells (cells S to which numbers "1" to "18" in FIG. 10 are allocated) set in step S620 (see FIG. 6). For example, when the material of processing target 8 is aluminum, control unit 211 sets an irradiation condition 1 illustrated in FIG. 11 to cell S assigned with number "1" in FIG. 10. Similarly, control unit 211 sets each of the irradiation conditions 2 to 18 illustrated in FIG. 11 to cells S to which numbers "2" to "18" are allocated in FIG. 10. Thus, different irradiation conditions are set for respective cells S of the test cells.

In the present embodiment, the number of types of irradiation conditions for the materials of the test cells and the number of cells of the test cells are both 18, but the present invention is not limited thereto. The number of types of irradiation conditions for the materials of the test cells is arbitrarily determined based on a range of irradiation conditions that can be set by laser marker 2 (see FIG. 1) (for example, a range in which power can be set, a range in which frequency can be set, and a range in which processing speed can be set), and the number of cells of the test cells may be equal to the number of types of irradiation conditions for the materials of the test cells. In addition, aluminum, iron, and plastic are examples of the materials of processing target 8, and in addition to the irradiation conditions illustrated in FIGS. 11 to 13, irradiation conditions suitable for materials other than aluminum, iron, and plastic may be stored in storage unit 213 as the irradiation conditions for the test cells.

In the present embodiment, the 18 irradiation conditions are respectively assigned to the 18 test cells, but there may be more than one test cells to which the same irradiation condition is assigned. For example, there may be two test cells to which the same irradiation condition is assigned. In this case, 9 kinds of irradiation conditions are allocated to 18 test cells.

The irradiation conditions set for the test cells may include a condition that the irradiation with the laser light is not performed. A test cell to which the condition that the irradiation of the laser light is not performed is set is a test cell for a white cell. That is, the irradiation condition for the white cell may include a condition that laser light irradiation is not performed. When the irradiation condition for the white cell is a condition that the irradiation of the laser light is not performed, the color after the base treatment (the color of the material of processing target 8 when the base treatment is not performed) remains as it is.

Referring to FIG. 6 again, control unit 211 sets the irradiation condition for the common print cell and stores the set irradiation condition in storage unit 213 (step S630). As an example, control unit 211 stores the cell number of cell S classified as the common print cell and the irradiation condition set for cell S specified by the cell number in storage unit 213 in association with each other. The common print cell is a printing target cell other than the test cells. The cell number of cell S classified as the common print cell is an example of the arrangement information of the common print cell. As the irradiation condition for the common print cell, the irradiation condition for the white cell and the irradiation condition for the black cell are determined one by one in advance. Since the color of the material of processing target 8 is often used as it is, the irradiation condition set as the irradiation condition for the common print cell is often either of the irradiation condition for the white cell and the irradiation condition for the black cell. Both the irradiation condition for the white cell and the irradiation condition for the black cell may be set as the irradiation condition for the common print cell.

Next, control unit 211 performs test processing treatment on the basis of the irradiation conditions set in steps S625 and S630 (step S635). Specifically, marking head 26 irradiates processing target 8 with the laser light based on the irradiation conditions set by control unit 211 in steps S625 and S630. Thus, processing pattern N is formed on processing target 8. Verification device 3 captures an image of processing pattern N formed on processing target 8, reads a code corresponding to processing pattern N on the basis of the captured image, and calculates a luminance value for each of cells S of processing pattern N. Verification device 3 transmits the calculated luminance value for each of cells S to controller 21. Here, processing of verification device 3 will be described with reference to FIGS. 2 and 14.

Figure 14:
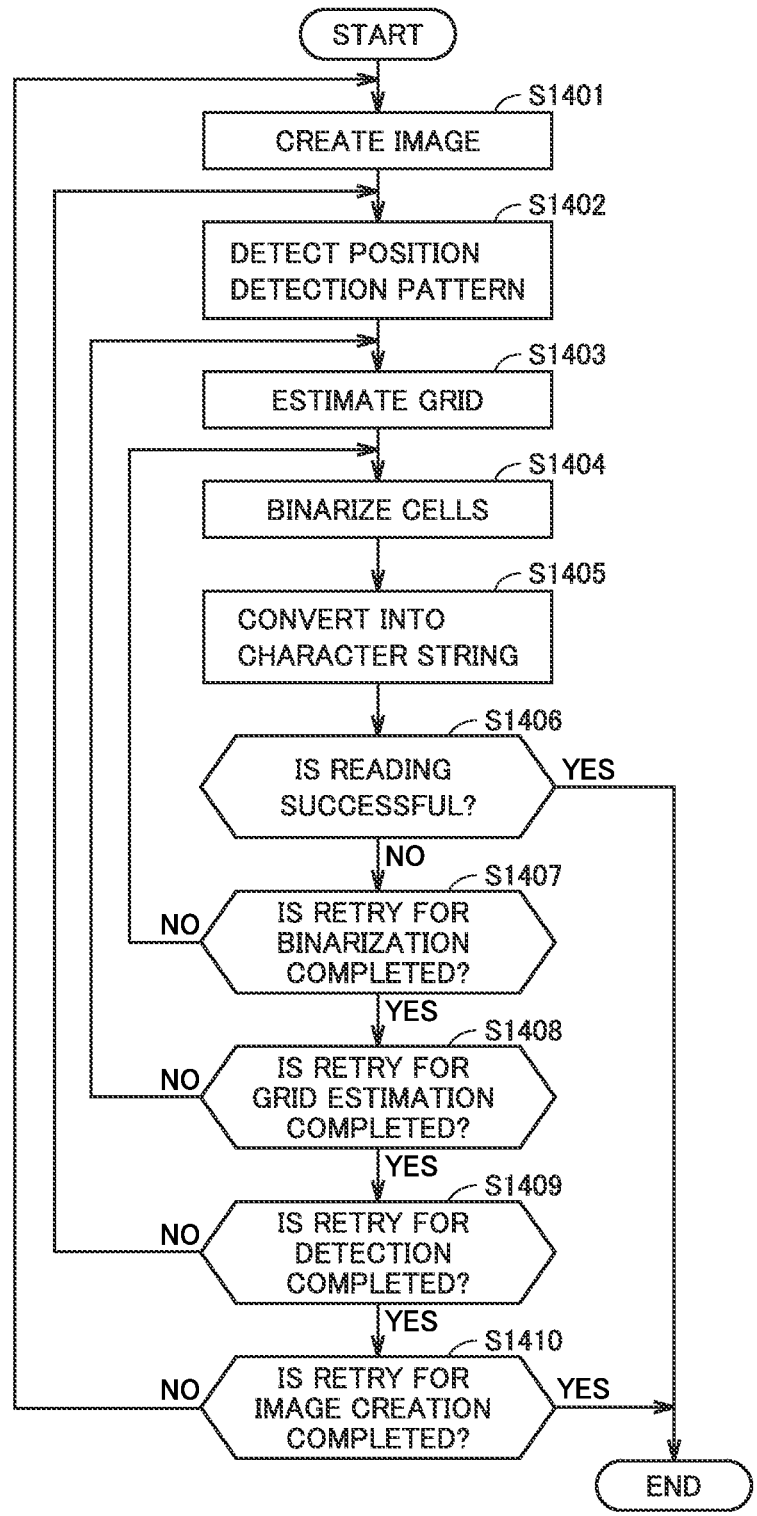
FIG. 14 is a flowchart illustrating an example of processing of the verification device according to the first embodiment.

FIG. 14 is a flowchart illustrating an example of processing of the verification device according to the first embodiment. The processing illustrated in FIG. 14 is realized by control unit 310 executing the application program stored in storage unit 320. The processing illustrated in FIG. 14 is started, for example, when a button or the like provided for verification device 3 is operated by the user.

In step S1401, control unit 310 causes imaging unit 330 to capture an image of the processing pattern formed on processing target 8, and performs preprocessing on the captured image to create an image of the code.

In step S1402, control unit 310 detects a position detection pattern from the created image of the code. In a case where the processing pattern is DataMatrix as illustrated in FIG. 8, control unit 310 detects an L shape arranged by the left side and the lower side of the cord (region R10 illustrated in FIG. 10). As a result, the position and the posture of the code are estimated.

Note that, if the processing pattern is a QR code, in step S1402, control unit 310 detects a finder pattern F arranged at three vertexes of the code (see FIG. 17), and estimates the position and the posture of the QR code on the basis of the detected finder pattern F.

In step S1403, control unit 310 estimates a grid. The grid is a center position of each cell. That is, the position of each cell is specified by the processing in step S1403. In a case where the processing pattern is DataMatrix as illustrated in FIG. 8, control unit 310 estimates the grid by obtaining a clock track from the detected L shape.

In step S1404, control unit 310 calculates a luminance value at the center position of each cell, determines whether each cell is a dark cell ("1") or a bright cell ("0"), and thus binarizes each cell.

In step S1405, control unit 310 converts the binarized 0/1 information into a character string. At the time of conversion, error correction is also considered.

In step S1406, control unit 310 determines whether or not the reading is successful. If the reading is successful (YES in step S1406), control unit 310 ends a series of processing illustrated in FIG. 14. On the other hand, if the reading fails (NO in step S1406), control unit 310 moves the processing to step S1407.

In step S1407, control unit 310 determines whether or not retry for binarization of a cell has been completed. The retry is to change the setting when reading fails and perform the process again. If the retry for the binarization of the cell is completed (YES in step S1407), control unit 310 moves the processing to step S1408. On the other hand, if the retry for the binarization of the cell has not been completed (NO in step S1407), control unit 310 returns the processing to step S1404.

In step S1408, control unit 310 determines whether or not retry for grid estimation has been completed. If the retry for grid estimation has been completed (YES in step S1408), control unit 310 moves the processing to step S1409. On the other hand, if the retry for grid estimation has not been completed (NO in step S1408), control unit 310 returns the processing to step S1403.

In step S1409, control unit 310 determines whether or not retry for detection of the position detection pattern has been completed. If the retry for the detection of the position detection pattern is completed (YES in step S1409), control unit 310 moves the processing to step S1410. On the other hand, if the retry for the detection of the position detection pattern has not been completed (NO in step S1409), control unit 310 returns the processing to step S1402.

In step S1410, control unit 310 determines whether or not retry for image creation has been completed. If the retry for image creation has been completed (YES in step S1410), control unit 310 ends a series of processing illustrated in FIG. 14. On the other hand, if the retry for image creation has not been completed (NO in step S1410), control unit 310 returns the processing to step S1401.

Control unit 310 reads a code by a method as illustrated in FIG. 14. Control unit 310 stores the luminance value when the reading is successful in the storage unit 320 for each cell. As an example, control unit 310 stores the luminance value of each cell and the position information in the code of each cell in storage unit 320 in association with each other. Control unit 310 transmits the luminance value of each cell when the reading is successful (including the luminance value of each cell and position information in the code of each cell) to laser marker 2. Accordingly, in step S640 illustrated in FIG. 6, control unit 211 determines YES.

Referring to FIG. 6 again, control unit 211 determines whether the luminance value for each of cells S has been received from verification device 3 (step S640). If the luminance value for each of cells S has been received from verification device 3 (YES in step S640), control unit 211 moves the processing to step S645.

In step S645, control unit 211 determines whether or not at least one of the black-and-white contrast of the common print cell being below the threshold value, the white variation of the common print cell being above the threshold value, and the black variation of the common print cell being above the threshold value is applicable, based on the luminance value for each of cells calculated by control unit 310. In step S645, it is determined whether or not the irradiation condition set for the common print cell satisfies a quality criterion. The case where at least one of the black-and-white contrast of the common print cell being below the threshold value, the white variation of the common print cell being above the threshold value, and the black variation of the common print cell being above the threshold value is applicable is an example of a case where the variation in the luminance value in the region where the same irradiation condition is set in test processing exceeds the threshold value.

If at least one of the black-and-white contrast of the common print cell being below the threshold value, the white variation of the common print cell being above the threshold value, and the black variation of the common print cell being above the threshold value is applicable (YES in step S645), control unit 211 moves the processing to step S650. On the other hand, if none of the black-and-white contrast of the common print cell being below the threshold value, the white variation of the common print cell being above the threshold value, and the black variation of the common print cell being above the threshold value is applicable (NO in step S645), control unit 211 moves the processing to step S680.

In step S650, control unit 211 determines whether or not there is a test cell having luminance lower than that of the common print cell, on the basis of the arrangement information of cells S stored in storage unit 213 and the luminance value for each of cells S received from verification device 3. The arrangement information of cells S includes the arrangement information of the test cells and the arrangement information of the common print cell described above. Specifically, in step S650, control unit 211 extracts the cell number of cell S having the lowest luminance among the test cells, based on the arrangement information of cells S and the luminance value for each of cells S received from verification device 3. The cell number of cell S having the lowest luminance among the test cells is an example of "information on the luminance values of the test cells". Control unit 211 determines whether or not there is a test cell having luminance lower than that of the common print cell, by comparing the luminance value of cell S specified by the extracted cell number with the luminance value of the common print cell. If there is a test cell having luminance lower than that of the common print cell (YES in step S650), control unit 211 moves the processing to step S655. On the other hand, if there is no test cell having luminance lower than that of the common print cell (NO in step S650), control unit 211 moves the processing to step S660.

In step S655, control unit 211 sets the irradiation condition for a test cell having the lowest luminance as the irradiation condition for actual processing treatment. Specifically, in step S655, control unit 211 sets the irradiation condition associated with the cell number extracted in step S650 among the irradiation conditions stored in storage unit 213 as the irradiation condition for actual processing treatment.

In step S660, control unit 211 sets the irradiation condition for the common print cell as the irradiation condition for actual processing treatment. Specifically, in step S660, control unit 211 sets the irradiation condition for the black cell among the irradiation conditions for the common print cell stored in storage unit 213 as the irradiation condition for actual processing treatment.

In step S665, control unit 211 determines whether or not there is a test cell having luminance higher than that of the common print cell on the basis of the arrangement information of cells S stored in storage unit 213 and the luminance value for each of cells S received from verification device 3. Specifically, control unit 211 extracts the cell number of cell S having the highest luminance among the test cells based on the arrangement information of cells S and the luminance value for each of cells S received from verification device 3. The cell number of cell S having the highest luminance among the test cells is an example of "information on the luminance values of the test cells". Control unit 211 determines whether or not there is a test cell having luminance higher than that of the common print cell, by comparing the luminance value of cell S specified by the extracted cell number with the luminance value of the common print cell. If there is a test cell having luminance higher than that of the common print cell (YES in step S665), control unit 211 moves the processing to step S670. On the other hand, if there is no test cell having luminance higher than that of the common print cell (NO in step S665), control unit 211 moves the processing to step S675.

In step S670, control unit 211 sets the irradiation condition for the test cell having the highest luminance as the irradiation condition for actual base treatment. Specifically, in step S670, control unit 211 sets the irradiation condition associated with the cell number extracted in step S665 among the irradiation conditions stored in storage unit 213 as the irradiation condition for actual base treatment. In step S670, control unit 211 may set the irradiation condition for actual base treatment in consideration of the irradiation condition for test base treatment, in addition to the irradiation condition of the test cell having the highest luminance.

In step S675, control unit 211 sets the irradiation condition for test base treatment stored in storage unit 213 as the irradiation condition for actual base treatment.

In step S680, control unit 211 sets the irradiation condition for the common print cell as the irradiation condition for actual processing treatment. Note that the processing in step S680 is the same as the processing in step S660.

In step S685, control unit 211 sets the irradiation condition for test base treatment as the irradiation condition for actual base treatment. Note that the processing in step S685 is the same as the processing in step S675.

After step S670, step S675, or step S685, control unit 211 ends a series of processing shown in FIGS. 6 and 7.

As described above, the irradiation conditions for the test cells may include a condition that the irradiation of the laser light is not performed, and the irradiation condition for test base treatment may include a condition that the base treatment is not performed. Therefore, it may be determined that the base treatment is not performed in steps S670, S675, and S685.

In addition, in the above description, after the test base treatment (processing of step S615) is performed, control unit 211 sets the irradiation conditions of the test cells and the common print cell, and then performs the test processing treatment (processing of step S635). However, control unit 211 may perform the test base treatment and the test processing treatment after setting the irradiation condition for test base treatment, the irradiation conditions for the test cells, and the irradiation condition for the common print cell.

As described above, laser processing system 1 according to the first embodiment sets at least two or more cells S among cells S included in received processing pattern N as the test cells. Laser processing system 1 sets different irradiation conditions for each of cells S included in the test cells, sets at least one of an irradiation condition for a white cell and an irradiation condition for a black cell for the common print cell, and performs test processing. A verification device 3 calculates a luminance value for each of cells S of processing pattern N formed by the test processing. Laser marker 2 extracts information on the luminance values of the test cells based on the luminance value for each of cells S calculated by verification device 3, and sets the irradiation condition for main processing based on the extracted information. As a result, an optimum irradiation condition can be set by one-time test processing, so that laser processing system 1 can set an appropriate irradiation condition without taking time and effort.

In laser processing system 1, the irradiation condition is improved only when the irradiation condition set for the common print cell does not satisfy the quality criterion, but the irradiation condition may be always improved regardless of whether or not the irradiation condition set for the common print cell satisfies the quality criterion, and in such a case, the determination processing in step S645 illustrated in FIG. 7 is not performed.

In addition, laser marker 2 may set the test cells according to a predetermined rule, or may set the test cells according to user's designation.

In addition, the luminance value for each cell calculated by verification device 3 may be an average density in each cell.

Furthermore, the above-described setting method can also be applied to a case where white printing is performed on a black background. In a case where white printing is performed on a black background, the processing in steps S650 to S670 and S680 is read as follows. Step S650 is read as "control unit 211 determines whether or not there is a test cell having luminance higher than that of the common print cell on the basis of the arrangement information of cells S stored in storage unit 213 and the luminance value for each of cells S received from verification device 3". Step S655 is read as "control unit 211 sets the irradiation condition for a test cell having the highest luminance as the irradiation condition for actual processing treatment". Steps S660 and S680 are read as "control unit 211 sets the irradiation condition for the common print cell as the irradiation condition for actual processing treatment. Specifically, in step S660, control unit 211 sets the irradiation condition for the white cell among the irradiation conditions of the common print cell stored in storage unit 213 as the irradiation condition for actual processing treatment". Step S665 is read as "control unit 211 determines whether or not there is a test cell having luminance lower than that of the common print cell on the basis of the arrangement information of cells S stored in storage unit 213 and the luminance value for each of cells S received from verification device 3". In step S670, "control unit 211 sets the irradiation condition for a test cell having the lowest luminance as the irradiation condition for actual base treatment. Note that control unit 211 may set the irradiation condition for actual base treatment in consideration of the irradiation condition for test base treatment, in addition to the irradiation condition of the test cell having the lowest luminance".

In addition, control unit 211 may set only the irradiation condition for actual processing treatment and may not set the irradiation condition for actual base treatment. In this case, control unit 211 may extract at least one of the cell number of cell S having the lowest luminance among the test cells and the cell number of cell S having the highest luminance among the test cells as the information on the luminance values of the test cells.

First Modification of First Embodiment

A first modification of the processing by controller 21 will be described with reference to FIGS. 1, 2, 7, and 15. In the first modification, control unit 211 extracts a cell number of cell S having the second lowest luminance among the test cells and a cell number of cell S having the second highest luminance among the test cells as the information on the luminance values of the test cells.

Figure 15:
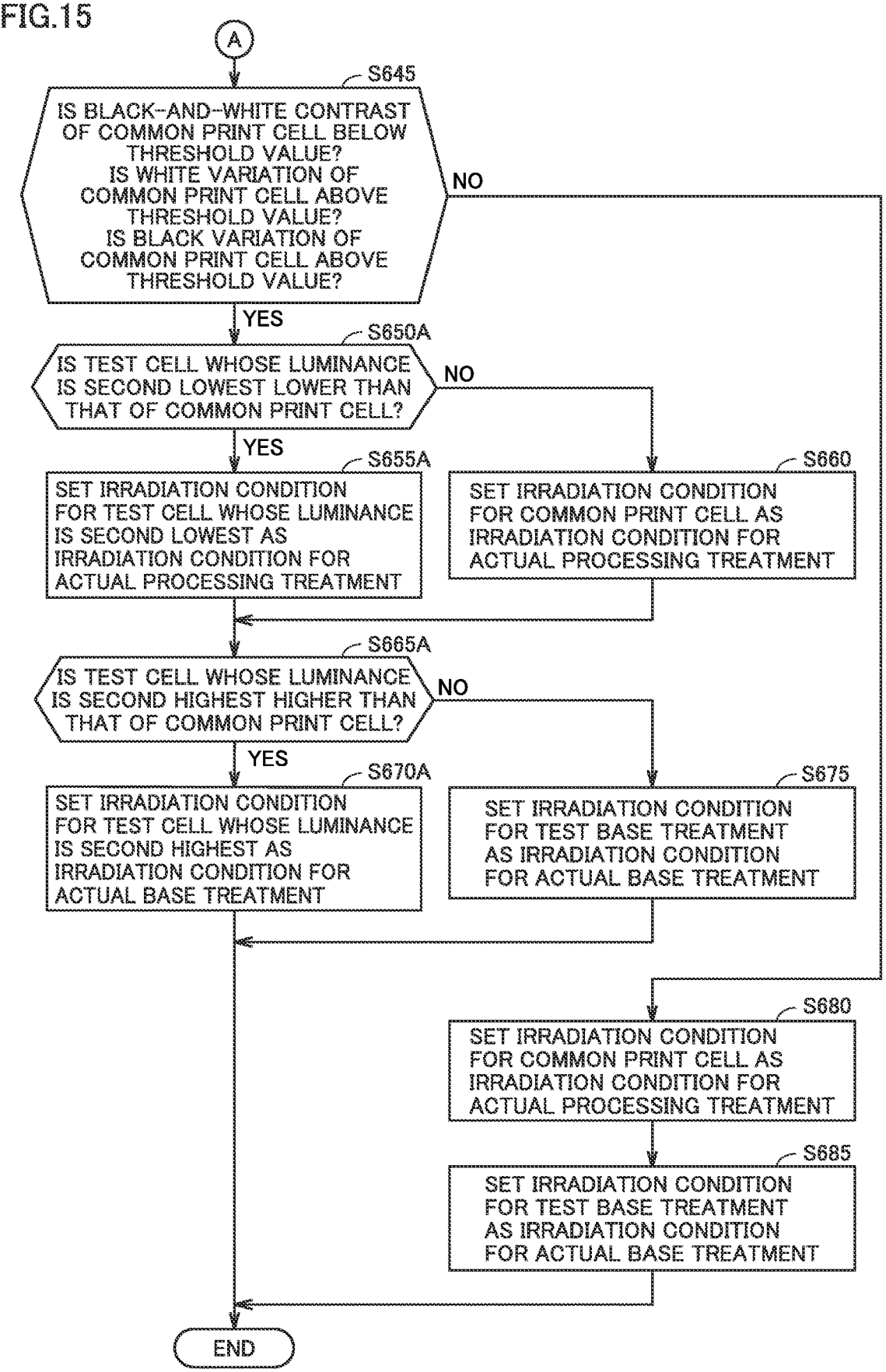
FIG. 15 is a flowchart illustrating a first modification of the processing of the controller according to the first embodiment.

FIG. 15 is a flowchart illustrating the first modification of the processing of the controller according to the first embodiment. The processing illustrated in FIG. 15 is realized by control unit 211 executing the application program stored in storage unit 213. After the processing of steps S605 to S640 illustrated in FIG. 6, control unit 211 performs the processing illustrated in FIG. 15. Since the processing illustrated in FIG. 15 is similar to the processing illustrated in FIG. 7 except for step S650A, step S655A, step S665A, and step S670A, only step S650A, step S655A, step S665A, and step S670A will be described below.

In step S650A, control unit 211 determines whether or not the luminance of the test cell having the second lowest luminance is lower than the luminance of the common print cell on the basis of the arrangement information of cells S stored in storage unit 213 and the luminance value for each of cells S received from verification device 3. Specifically, in step S650A, control unit 211 extracts the cell number of cell S having the second lowest luminance among the test cells based on the arrangement information of cells S and the luminance value for each of cells S received from verification device 3. The cell number of cell S having the second lowest luminance among the test cells is an example of "information on the luminance values of the test cells". Control unit 211 determines whether or not the luminance of the test cell having the second lowest luminance is lower than the luminance of the common print cell, by comparing the luminance value of cell S specified by the extracted cell number with the luminance value of the common print cell. If the luminance of the test cell having the second lowest luminance is lower than the luminance of the common print cell (YES in step S650A), control unit 211 moves the processing to step S655A. On the other hand, if the luminance of the test cell having the second lowest luminance is not lower than the luminance of the common print cell (NO in step S650A), control unit 211 moves the processing to step S660.

In step S655A, control unit 211 sets the irradiation condition for the test cell having the second lowest luminance as the irradiation condition for actual processing treatment. Specifically, in step S655A, control unit 211 sets the irradiation condition associated with the cell number extracted in step S650A among the irradiation conditions stored in storage unit 213 as the irradiation condition for actual processing treatment.

In step S665A, control unit 211 determines whether or not the luminance of the test cell having the second highest luminance is higher than the luminance of the common print cell on the basis of the arrangement information of cells S stored in storage unit 213 and the luminance value for each of cells S received from verification device 3. Specifically, in step S665A, control unit 211 extracts the cell number of cell S having the second highest luminance among the test cells based on the arrangement information of cells S and the luminance value for each of cells S received from verification device 3. The cell number of cell S having the second highest luminance among the test cells is an example of "information on the luminance values of the test cells". Control unit 211 determines whether or not the luminance of the test cell having the second highest luminance is higher than the luminance of the common print cell, by comparing the luminance value of cell S specified by the extracted cell number with the luminance value of the common print cell. If the luminance of the test cell having the second highest luminance is higher than the luminance of the common print cell (YES in step S665A), control unit 211 moves the processing to step S670A. On the other hand, if the luminance of the test cell having the second highest luminance is not higher than the luminance of the common print cell (NO in step S665A), control unit 211 moves the processing to step S675.

In step S670A, control unit 211 sets the irradiation condition for the test cell having the second highest luminance as the irradiation condition for actual base treatment. Specifically, in step S670A, control unit 211 sets the irradiation condition associated with the cell number extracted in step S665A among the irradiation conditions stored in storage unit 213 as the irradiation condition for actual base treatment. In step S670A, control unit 211 may set the irradiation condition for actual base treatment in consideration of the irradiation condition for test base treatment, in addition to the irradiation condition of the test cell having the second highest luminance.

By the processing illustrated in FIGS. 6 and 15, even when there is a cell S having abnormally high luminance or a cell S having abnormally low luminance in the test cells, the irradiation condition of laser light W for main processing is set except for cell S having the highest luminance and cell S having the lowest luminance in the test cells. As a result, accuracy of the irradiation condition for main processing increases.

Note that the setting method illustrated in FIGS. 6 and 15 can also be applied to a case where white printing is performed on a black background. In a case where white printing is performed on a black background, the processing in steps S650A to S670A and S680 is read as follows. Step S650A is read as "control unit 211 determines whether or not the luminance of the test cell having the second highest luminance is higher than the luminance of the common print cell on the basis of the arrangement information of cells S stored in storage unit 213 and the luminance value for each of cells S received from verification device 3". Step S655A is read as "control unit 211 sets the irradiation condition for a test cell having the second highest luminance as the irradiation condition for actual processing treatment". Steps S660 and S680 are read as "control unit 211 sets the irradiation condition for the common print cell as the irradiation condition for actual processing treatment. Specifically, control unit 211 sets the irradiation condition for the white cell among the irradiation conditions for the common print cell as the irradiation condition for actual processing treatment". Step S665A is read as "control unit 211 determines whether or not the luminance of the test cell having the second lowest luminance is lower than the luminance of the common print cell on the basis of the arrangement information of cells S stored in storage unit 213 and the luminance value for each of cells S received from verification device 3". Step S670A is read as "control unit 211 sets the irradiation condition for the test cell having the second lowest luminance as the irradiation condition for actual base treatment. Note that control unit 211 may set the irradiation condition for actual base treatment in consideration of the irradiation condition for test base treatment, in addition to the irradiation condition of the test cell having the second lowest luminance".

Also in the first modification, control unit 211 may set only the irradiation condition for actual processing treatment and may not set the irradiation condition for actual base treatment. In this case, control unit 211 may extract at least one of the cell number of cell S having the second lowest luminance among the test cells and the cell number of cell S having the second highest luminance among the test cells.

[Second Modification of First Embodiment]

A second modification of the processing by controller 21 will be described with reference to FIGS. 1, 2, 7, and 16. In the second modification, control unit 211 extracts cell numbers of n (n is an integer of 2 or more) test cells having low luminance among the test cells and cell numbers of n test cells having low luminance among the test cells as the information on the luminance values of the test cells.

Figure 16:
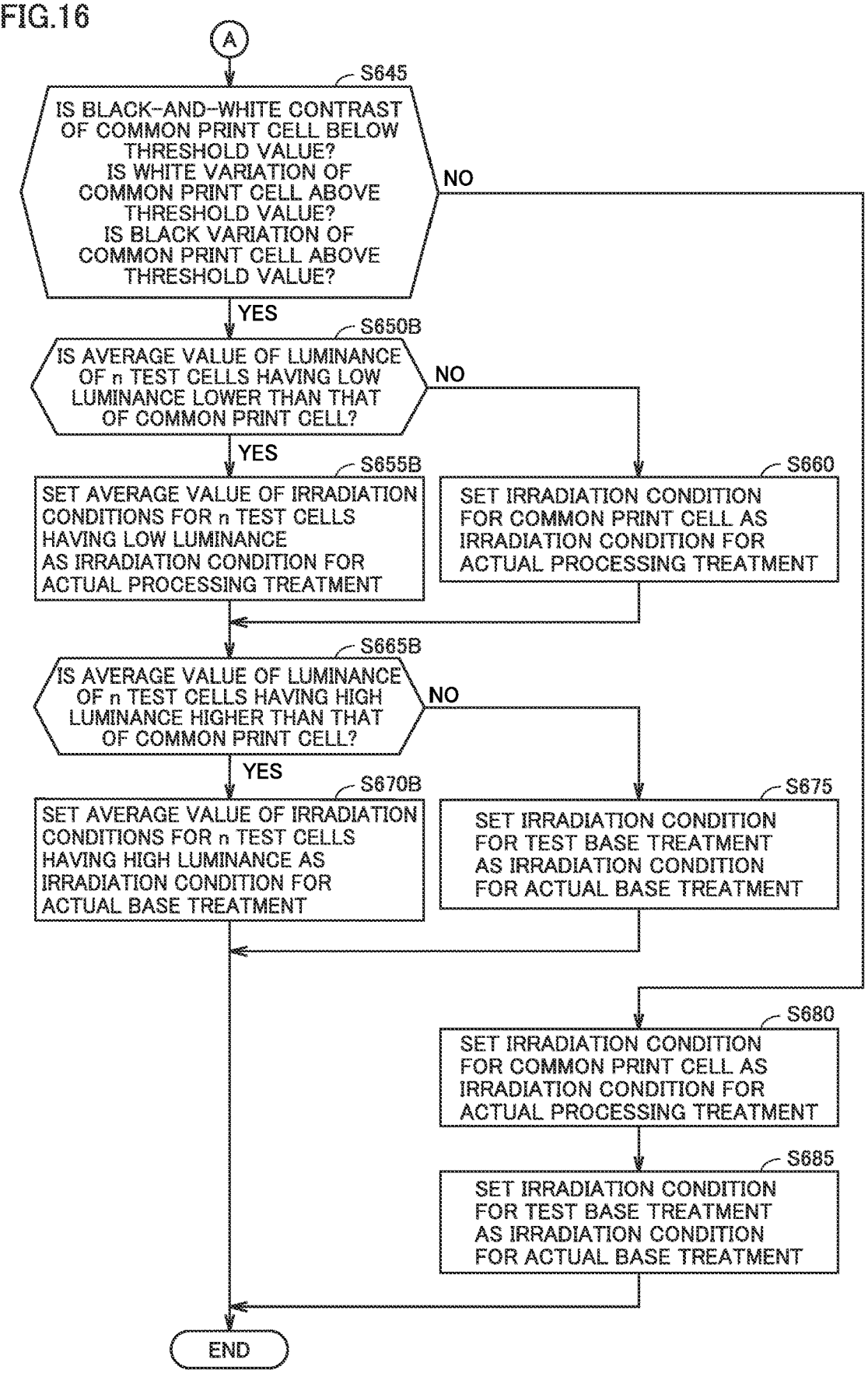
FIG. 16 is a flowchart illustrating a second modification of the processing of the controller according to the first embodiment.

FIG. 16 is a flowchart illustrating the second modification of the processing of the controller according to the first embodiment. The processing illustrated in FIG. 16 is realized by control unit 211 executing the application program stored in storage unit 213. After the processing of steps S605 to S640 illustrated in FIG. 6, control unit 211 performs the processing illustrated in FIG. 16. Since the processing illustrated in FIG. 16 is similar to the processing illustrated in FIG. 7 except for step S650B, step S655B, step S665B, and step S670B, only step S650B, step S655B, step S665B, and step S670B will be described below.

In step S650B, control unit 211 determines whether or not an average value of the luminance of the n test cells having low luminance is lower than the luminance value of the common print cell on the basis of the arrangement information of cells S stored in storage unit 213 and the luminance value for each of cells S received from verification device 3. Specifically, based on the arrangement information of cells S and the luminance value for each of cells S received from verification device 3, control unit 211 selects n cells S in ascending order of luminance among the test cells, and extracts cell numbers of the selected cells S. The cell numbers of n cells S selected in ascending order of luminance among the test cells are an example of "information on the luminance values of the test cells". Control unit 211 calculates an average value of the luminance of cells S specified by the extracted cell numbers. Control unit 211 compares the calculated luminance value with the luminance value of the common print cell, and determines whether or not the average value of the luminance of n test cells having low luminance is lower than the luminance value of the common print cell. If the average value of the luminance of the n test cells having low luminance is lower than the luminance value of the common print cell (YES in step S650B), control unit 211 moves the processing to step S655B. On the other hand, if the average value of the luminance of the n test cells having low luminance is not lower than the luminance value of the common print cell (NO in step S650B), control unit 211 moves the processing to step S660.

In step S655B, control unit 211 sets the average value of the irradiation conditions set for the n test cells with low luminance as the irradiation condition for actual processing treatment. Specifically, in step S655B, control unit 211 calculates an average value of the irradiation conditions associated with the cell numbers extracted in step S650B among the irradiation conditions stored in storage unit 213, and sets the calculated average value as the irradiation condition for actual processing treatment In step S665B, control unit 211 determines whether or not an average value of the luminance of the n test cells having high luminance is higher than the luminance value of the common print cell on the basis of the arrangement information of cells S stored in storage unit 213 and the luminance value for each of cells S received from verification device 3. Specifically, based on the arrangement information of cells S and the luminance value for each of cells S received from verification device 3, control unit 211 selects n cells S in descending order of luminance among the test cells, and extracts cell numbers of the selected cells S. The cell numbers of n cells S selected in descending order of luminance among the test cells are an example of "information on the luminance values of the test cells". Control unit 211 calculates an average value of the luminance of cells S specified by the extracted cell numbers. Control unit 211 compares the calculated luminance value with the luminance value of the common print cell, and determines whether or not the average value of the luminance of n test cells having high luminance is higher than the luminance value of the common print cell. If the average value of the luminance of the n test cells having high luminance is higher than the luminance value of the common print cell (YES in step S665B), control unit 211 moves the processing to step S670B. On the other hand, if the average value of the luminance of the n test cells having high luminance is not higher than the luminance value of the common print cell (NO in step S665B), control unit 211 moves the processing to step S675.

In step S670B, control unit 211 sets the average value of the irradiation conditions set for the n test cells with high luminance as the irradiation condition for actual base treatment. Specifically, in step S670B, control unit 211 calculates an average value of the irradiation conditions associated with the cell numbers extracted in step S665B among the irradiation conditions stored in storage unit 213, and sets the calculated average value as the irradiation condition for actual base treatment. In step S670B, control unit 211 may set the irradiation condition for actual base treatment in consideration of the irradiation condition for test base treatment, in addition to the average value of the irradiation conditions set for the n test cells having high luminance.

By the processing illustrated in FIGS. 6 and 16, even when there is a cell S having abnormally high luminance or a cell S having abnormally low luminance in the test cells, an average value of the irradiation conditions set for the test cells having relatively high luminance in the test cells is set as the irradiation condition for actual base treatment, and an average value of the irradiation conditions set for the test cells having relatively low luminance in the test cells is set as the irradiation condition for actual processing treatment. As a result, accuracy of the irradiation condition for main processing increases.

In step S655B, control unit 211 may set a median value of the irradiation conditions set for the n test cells having low luminance as the irradiation condition for actual processing treatment. In step S670B, control unit 211 may set a median of the irradiation conditions set for the n test cells having high luminance as the irradiation condition for actual base treatment.

Furthermore, in step S650B, control unit 211 may rank the test cells on the basis of the luminance values for respective cells S received from verification device 3, select k-th to (k+m)th (k and m are integers of 1 or more.) cells S of the lower ranking, and extract cell numbers of selected cells S. In this case, control unit 211 calculates an average value of the luminance of cells S specified by the extracted cell numbers, and compares the calculated luminance value with the luminance value of the common print cell. If the calculated luminance value is lower than the luminance value of the common print cell (YES in step S650B), control unit 211 sets the average value of the irradiation conditions set for k-th to (k+m)th test cells of the lower ranking as the irradiation condition for actual processing treatment (step S655B). Furthermore, in step S665B, control unit 211 may rank the test cells on the basis of the luminance values for respective cells S received from verification device 3, select k-th to (k+m)th cells S of the higher ranking, and extract cell numbers of selected cells S. In this case, control unit 211 calculates an average value of the luminance of cells S specified by the extracted cell numbers, and compares the calculated luminance value with the luminance value of the common print cell. If the calculated luminance value is higher than the luminance value of the common print cell (YES in step S665B), control unit 211 sets the average value of the irradiation conditions set for k-th to (k+m)th test cells of the higher ranking as the irradiation condition for actual base treatment (step S670B).

Note that the setting method illustrated in FIGS. 6 and 16 can also be applied to a case where white printing is performed on a black background. In a case where white printing is performed on a black background, the processing in steps S650B to S670B and S680 is read as follows. Step S650B is read as "control unit 211 determines whether or not an average value of the luminance of the n test cells having high luminance is higher than the luminance value of the common print cell on the basis of the arrangement information of cells S stored in storage unit 213 and the luminance value for each of cells S received from verification device 3". Step S655B is read as "control unit 211 sets the average value of the irradiation conditions set for the n test cells with high luminance as the irradiation condition for actual processing treatment". Steps S660 and S680 are read as "control unit 211 sets the irradiation condition for the common print cell as the irradiation condition for actual processing treatment. In particular, control unit 211 sets the irradiation condition for the white cell among the irradiation conditions of the common print cell as the irradiation condition for actual processing treatment". Step S665B is read as "control unit 211 determines whether or not an average value of the luminance of the n test cells having low luminance is lower than the luminance value of the common print cell on the basis of the arrangement information of cells S stored in storage unit 213 and the luminance value for each of cells S received from verification device 3". Step S670B is read as "control unit 211 sets the average value of the irradiation conditions set for the n test cells with low luminance as the irradiation condition for actual base treatment. Control unit 211 may set the irradiation condition for actual base treatment in consideration of the irradiation condition for test base treatment, in addition to the average value of the irradiation conditions set for the n test cells having low luminance".

Also in the second modification, control unit 211 may set only the irradiation condition for actual processing treatment and may not set the irradiation condition for actual base treatment. In this case, control unit 211 may extract at least one of the cell numbers of the n test cells selected in ascending order of luminance among the test cells and cell numbers of the n test cells selected in descending order of luminance among the test cells.

Second Embodiment

In the first embodiment, laser marker 2 extracts information on the luminance values of the test cells. On the other hand, in the second embodiment, the verification device extracts information on the luminance values of the test cells. In the second embodiment, as in the first embodiment, the processing pattern in test processing is a two-dimensional code. Since the configuration of the laser processing system according to the second embodiment is similar to the configuration of laser processing system 1 according to the first embodiment, the same reference numerals as those in the first embodiment are given, and the description thereof will not be repeated. Hereinafter, differences from the first embodiment will be mainly described.

Referring to FIGS. 2 and 6, in order for verification device 3 to extract information on the luminance values of the test cells, it is necessary to be able to specify positions corresponding to the test cells from the captured image (hereinafter, also referred to as "positions of the test cells") when the processing pattern formed on processing target 8 by test processing is captured. Therefore, in laser processing system 1 according to the second embodiment, laser marker 2 transmits the arrangement information of the test cells to verification device 3.

The arrangement information of the test cells is information indicating the arrangement of the test cells set in step S620. Specifically, the arrangement information of the test cells is information indicating a relative positional relationship between a position detection pattern (the above-described L shape, finder pattern, or the like) and each of the test cells, and is, for example, information indicating a rule by which numbers are assigned to the respective cells and the numbers assigned to the cells set as the test cells. After step S620, laser marker 2 transmits the arrangement information of the test cells to verification device 3.

Figure 17:
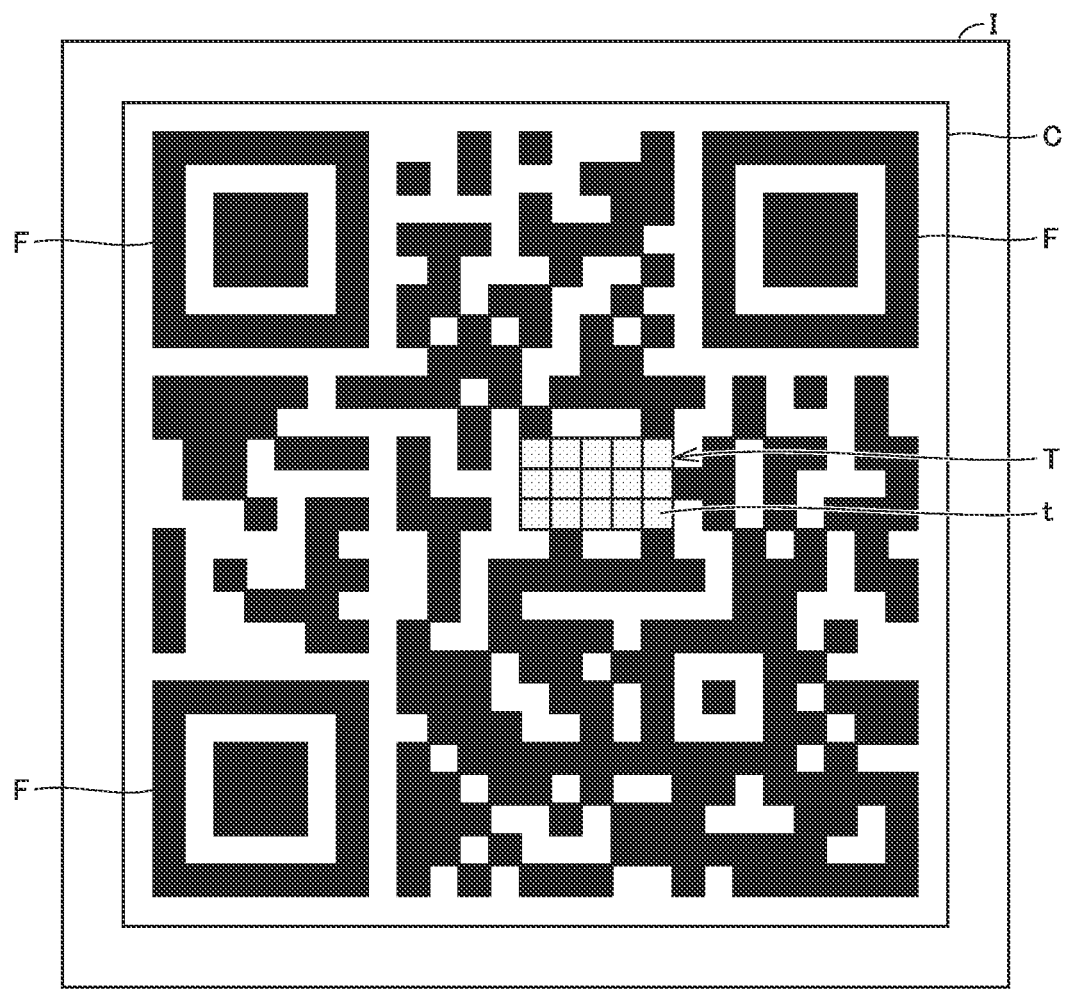
FIG. 17 is a diagram for describing an example of the processing of the verification device according to a second embodiment.

The processing of verification device 3 according to the second embodiment will be described with reference to FIGS. 2, 14, and 17. FIG. 17 is a diagram for describing an example of the processing of the verification device according to the second embodiment. In FIG. 17, a case where a code C is a QR code will be described as an example.

Verification device 3 (specifically, control unit 310) receives the arrangement information of test cells t from laser marker 2 at the beginning of the processing illustrated in FIG. 14. Control unit 310 executes the processing illustrated in FIG. 14 and stores the luminance value when the reading is successful in storage unit 320 for each cell.

An image I illustrated in FIG. 17 is an image of code C created in step S1401. Note that, in FIG. 17, in order to distinguish between test cells t and other cells, dot hatching is applied to the cell corresponding to test cells t. In practice, a region (test cell region T) of test cells t appearing in image I captured by verification device 3 appears as an aggregate of white cells and black cells with shading similarly to the regions other than test cell region T.

Control unit 310 specifies the position of each of test cells t based on the arrangement information of test cells t received from laser marker 2. Control unit 310 refers to the luminance value of each cell when the reading is successful stored in storage unit 320, and specifies the luminance value of each of test cells t. Control unit 310 extracts information on the luminance values of test cells t, that is, the cell numbers of test cells t satisfying the predetermined condition, based on the arrangement information of test cells t and the specified luminance values of test cells t. Communication processing unit 340 (corresponding to a "communication unit") transmits the information on the luminance values of test cells t extracted by control unit 310 to laser marker 2.

Laser marker 2 (specifically, control unit 211) receives the information on the luminance values of test cells t from verification device 3, and sets the irradiation condition for main processing based on the received information and the irradiation conditions set for the cell indicated by the received information. As an example, laser marker 2 sets the irradiation condition set for the cell indicated by the information on the luminance values of test cells t received from verification device 3 as the irradiation condition for main processing.

Note that the arrangement information of test cells t may be stored in advance in storage unit 213 of laser marker 2 and storage unit 320 of verification device 3. In this case, the arrangement information of test cells t is not transmitted or received between laser marker 2 and verification device 3. In this case, laser marker 2 sets test cells t based on the arrangement information of test cells t stored in storage unit 213.

As described above, according to the second embodiment, verification device 3 can specify the positions of test cells t. Therefore, verification device 3 can extract information on the luminance values of test cells t and transmit the extracted information to laser marker 2. As a result, laser marker 2 may set the irradiation condition for main processing on the basis of the information on the luminance values of test cells t received from verification device 3 and the irradiation conditions set for test cells t, and thus the processing load of laser marker 2 is reduced.

Further, according to the second embodiment, similarly to the first embodiment, an optimum irradiation condition can be set by one test processing. Therefore, it is possible to set an appropriate irradiation condition without taking time and effort.

In addition, since the arrangement information of test cells t is transmitted from laser marker 2 to verification device 3 or stored in advance in storage unit 320, it is possible to save time and effort for the user to input the arrangement information of test cells t to verification device 3.

The information transmitted from verification device 3 to laser marker 2 may include, in addition to the cell numbers of test cells t satisfying the predetermined condition, the luminance values of test cells t satisfying the predetermined condition, and the luminance value of each cell of the common print cell. In this case, laser marker 2 may set the irradiation condition for main processing using any one of the flow illustrated in FIG. 7, the flow illustrated in FIG. 15, and the flow illustrated in FIG. 16 on the basis of the information received from verification device 3.

Third Embodiment

In the first and second embodiments, the processing pattern in test processing is a two-dimensional code. On the other hand, in the third embodiment, the processing pattern in test processing is other than the two-dimensional code. In the third embodiment, similarly to the second embodiment, the verification device extracts information on the luminance values of the test cells. Since the configuration of the laser processing system according to the third embodiment is similar to the configuration of laser processing system 1 according to the second embodiment, the same reference numerals as those in the second embodiment are given, and the description thereof will not be repeated. Hereinafter, differences from the second embodiment will be mainly described.

Control unit 211 (see FIG. 2) receives a processing pattern in which a positioning mark is added to a region in which test cells are arranged (test cell region). The positioning mark will be described with reference to FIGS. 2 and 18A-18D. FIGS. 18A-18D are diagrams illustrating an example of a positioning mark formed by a laser marker according to the third embodiment. In FIGS. 18A-18D, in order to facilitate understanding, cells corresponding to test cells t are dot-hatched.

Positioning mark M is a mark used to specify the positions of test cells t. The pattern of positioning mark M may be any pattern that can uniquely determine test cell region T, and may be, for example, a pattern in which three marks are combined as illustrated in FIG. 18A, a pattern including one L-shaped mark as illustrated in FIG. 18B, a pattern including one T-shaped mark as illustrated in FIG. 18C, or a pattern including a mark simulating a finder pattern as illustrated in FIG. 18D.

Figure 18A:
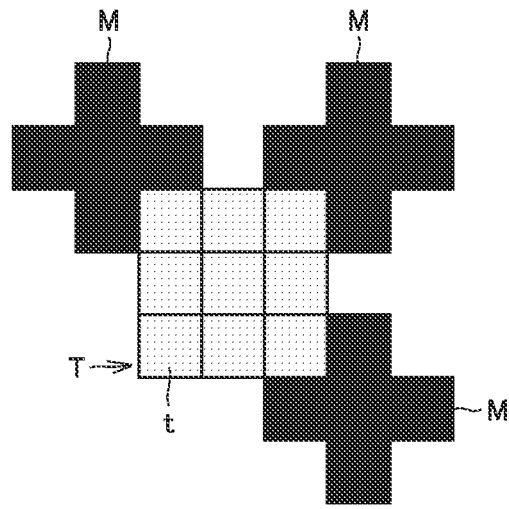
FIGS. 18A-18D are views illustrating an example of a positioning mark formed by a laser marker according to a third embodiment, where
Figure 18B:
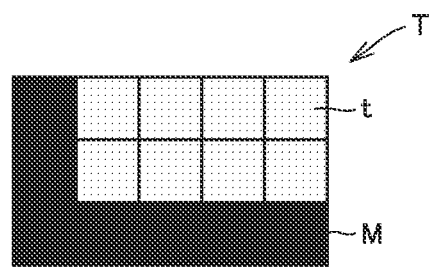
Figure 18C:
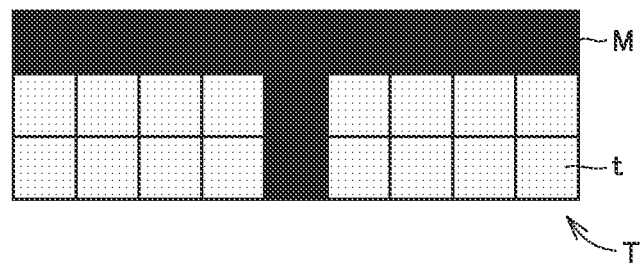
Figure 18D:
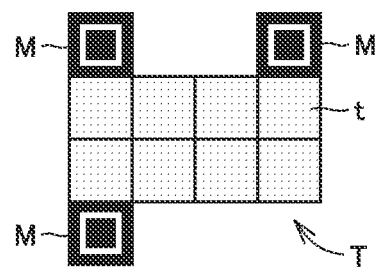

The pattern of positioning mark M is not limited to that illustrated in FIGS. 18A-18D. In addition, in a case where positioning mark M is a combination of a plurality of marks as illustrated in FIG. 18A, the number of included marks is not limited to 3, and the types of the marks may be different.

Figure 19:
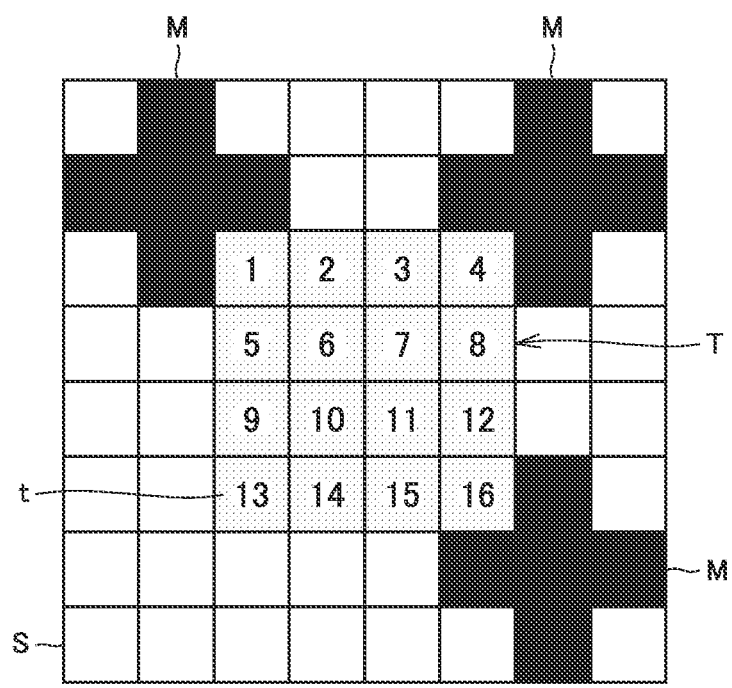
FIG. 19 is a diagram for illustration of an example of processing of the laser marker according to the third embodiment.

Processing of laser marker 2 according to the third embodiment will be described with reference to FIGS. 2, 6, and 19. FIG. 19 is a diagram for illustration of an example of processing of the laser marker according to the third embodiment. In FIG. 19, in order to distinguish between test cells t and cells S other than test cells t, cells corresponding to test cells t are dot-hatched.

Control unit 211 generates arrangement information of test cells t. In the example illustrated in FIG. 19, arrangement information of test cells t is as follows. That is, information on the pattern of positioning mark M is information that the pattern includes three cross marks. Information indicating a relative position between positioning mark M and test cell region T is information indicating that positioning mark M is arranged at three vertices among four vertices of test cell region T. The information indicating the arrangement of test cells t in test cell region T is information that test cell region T is divided into 4×4 test cells t, and cell numbers 1 to 16 are sequentially allocated from the upper left test cell t to the lower right test cell t.

Control unit 211 transmits the generated arrangement information of test cells t to verification device 3. Verification device 3 specifies the positions of test cells t respectively based on the arrangement information of test cells t.

Figure 20:
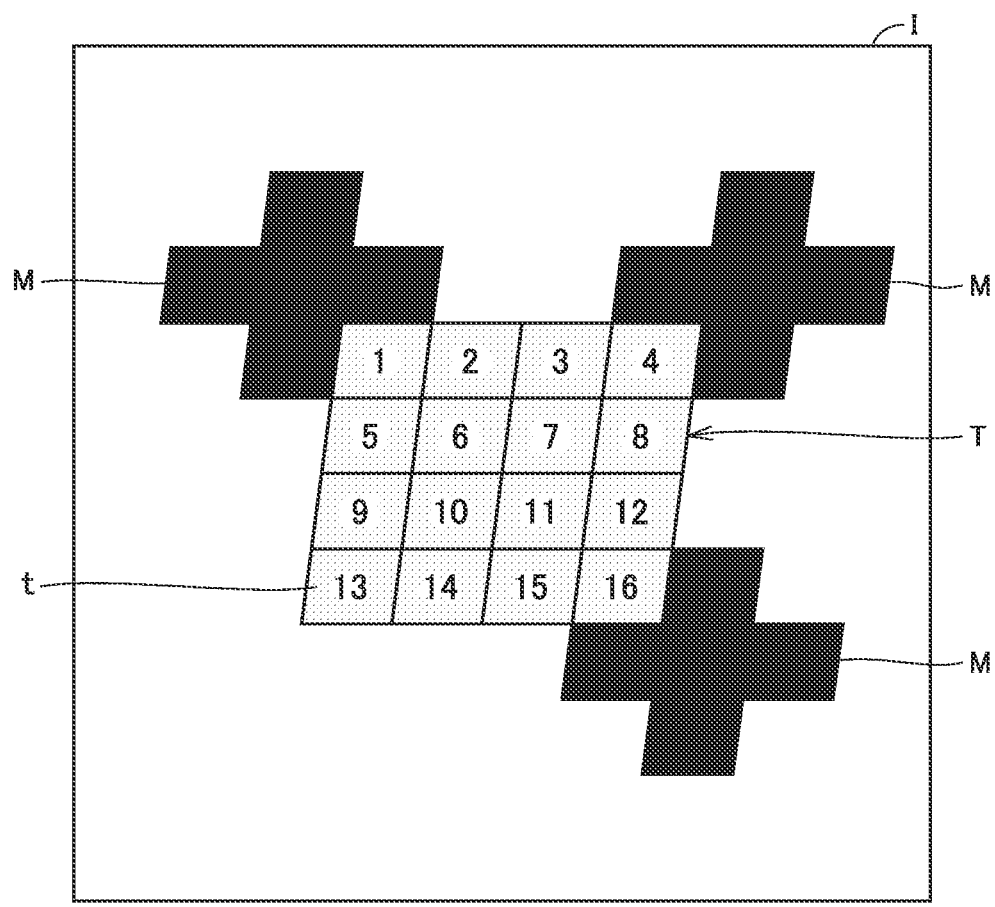
FIG. 20 is a diagram for illustration of an example of the processing of the verification device according to the third embodiment.

The processing of verification device 3 according to the third embodiment will be described with reference to FIGS. 2, 14, and 20. FIG. 20 is a diagram for describing an example of the processing of the verification device according to the third embodiment.

Verification device 3 (specifically, control unit 310) receives the arrangement information of test cells t from laser marker 2 at the beginning of the processing illustrated in FIG. 14. Thereafter, control unit 310 estimates a center position of each of test cells t by executing steps S1401 to S1403 of the processing illustrated in FIG. 14.

In step S1401, control unit 310 causes imaging unit 330 to capture an image of the processing pattern formed on processing target 8, and performs preprocessing on the captured image to create image I. Image I includes test cell region T and positioning mark M. When a processing surface of processing target 8 is not perpendicular to an imaging optical axis, test cell region T and positioning mark M appear distorted in image I as illustrated in FIG. 20.

In step S1402, control unit 310 detects positioning mark M from captured image I on the basis of the information on the pattern of positioning mark M included in the arrangement information of test cells t received from laser marker 2.

In step S1403, control unit 310 estimates a grid. Specifically, first, control unit 310 specifies test cell region T from image I based on the information indicating a relative position between positioning mark M and test cell region T included in the arrangement information of test cells t received from laser marker 2. Next, control unit 310 estimates the center position of each of test cells t from image I based on the information indicating the arrangement of test cells t in test cell region T included in the arrangement information of test cells t received from laser marker 2.

As an example, first, control unit 310 creates a parallelogram having three positioning marks M as three vertices, and specifies a region of the created parallelogram as test cell region T. Next, control unit 310 equally divides the specified test cell region T into 4×4, and estimates the center position of each area as the center position of each test cell t.

After step S1403, control unit 310 calculates a luminance value at the center position of each test cell t. Next, control unit 310 extracts information on the luminance values of test cells t, that is, the cell numbers of test cells t satisfying the predetermined condition, based on the information indicating the arrangement of test cells t in test cell region T included in the arrangement information of test cells t and the calculated luminance values of test cells t. Communication processing unit 340 (corresponding to a "communication unit") transmits the information on the luminance values of test cells t extracted by control unit 310 to laser marker 2.

Note that laser marker 2 may set a positioning mark according to a predetermined rule, or may set a positioning mark according to user's designation.

Further, the arrangement information of test cells t may be stored in advance in storage unit 213 of laser marker 2 and storage unit 320 of verification device 3. In this case, laser marker 2 performs setting of test cells t and setting of the positioning mark based on the arrangement information of test cells t stored in storage unit 213.

Further, according to the third embodiment, the same effects as those of the second embodiment can be obtained.

[Supplementary Note]

The embodiments and modifications described above may be selectively combined as appropriate. The embodiments described above include the following technical ideas.

[Configuration 1]

A laser processing system (1) comprising:
a laser processing device (2) configured to process a processing target (8) in accordance with a processing pattern (N); and
a verification device (3) configured to verify processing by the laser processing device (2), wherein the processing pattern (N) includes a plurality of cells (S), the laser processing device (2) includes:
a receiving unit (216) configured to receive the processing pattern (N);
a setting unit (211) configured to set an irradiation condition of laser light (W) for each of the cells (S) of the processing pattern (N) received by the receiving unit (216);
a first storage unit (213) configured to store the irradiation condition set by the setting unit (211) for the each of the cells (S) for which the irradiation condition is set; and
an irradiation unit (26) configured to irradiate the processing target (8) with the laser light (W) based on the irradiation condition set by the setting unit (211),
the setting unit (211) sets, as test cells, a part of the processing pattern (N) received in test processing, and sets different irradiation conditions respectively for the cells (S) included in the test cells (t),
the verification device (3) includes:
an imaging unit (330) configured to capture an image of the processing pattern (N) formed on the processing target (8); and
a calculation unit (310) configured to calculate luminance values for the cells (S) respectively based on the image captured by the imaging unit (330), and
the setting unit (211) sets at least one of the irradiation conditions for main processing, based on information on luminance values of the test cells (t) extracted from the luminance value for the cells (S) and based on the irradiation conditions set for the test cells (t).

[Configuration 2]
The laser processing system according to configuration 1, wherein
the verification device (3) further includes a transmission unit (340) configured to transmit the luminance values for the respective cells (S) calculated by the calculation unit (310) to the laser processing device (2), and
the setting unit (211) further extracts information on the luminance values of the test cells (t) based on arrangement information of the test cells (t) and the luminance values for the respective cells (S) received from the verification device (3).

[Configuration 3]
The laser processing system according to configuration 1, wherein
the verification device (3) further includes a communication unit (340) configured to communicate with the laser processing device (2),
the calculation unit (310) further extracts information on the luminance values of the test cells (t) based on arrangement information of the test cells (t) and on the calculated luminance values for the respective cells (S),
the communication unit (340) transmits the information on the luminance values of the test cells (t) extracted by the calculation unit (310) to the laser processing device (2), and
the setting unit (211) receives the information on the luminance values of the test cells (t) from the verification device (3).

[Configuration 4]
The laser processing system according to configuration 3, wherein the verification device (3) acquires the arrangement information of the test cells (t) from the laser processing device (2).

[Configuration 5]
The laser processing system according to configuration 3, wherein
the verification device (3) further includes a second storage unit (320), and
the arrangement information of the test cells (t) is stored in advance in the second storage unit (320).

[Configuration 6]
The laser processing system according to any one of configurations 1 to 5, wherein
the information on the luminance values of the test cells (t) includes at least one of information indicating a cell (S) whose luminance is highest in the test cells (t) and information indicating a cell (S) whose luminance is lowest in the test cells (t), and
the setting unit (211) sets the irradiation condition for main processing based on the irradiation condition set for the cell (S) specified by the information on the luminance values of the test cells (t).

[Configuration 7]
The laser processing system according to any one of configurations 1 to 5, wherein
the information on the luminance values of the test cells (t) includes at least one of information indicating two or more cells (S) selected in descending order of luminance in the test cells (t) and information indicating two or more cells (S) selected in ascending order of luminance in the test cells (t), and
the setting unit (211) sets the irradiation condition for main processing based on at least one of an average value of the irradiation conditions set for two or more cells (S) whose luminance is high among the cells (S) specified by the information on the luminance values of the test cells (t) and an average value of the irradiation conditions set for two or more cells (S) whose luminance is low among the cells (S) specified by the information on the luminance values of the test cells (t).

[Configuration 8]
The laser processing system according to any one of configurations 1 to 7, wherein
the receiving unit (216) receives a material of the processing target (8), and
the setting unit (211) sets different irradiation conditions respectively for the cells (S) on the test cells (t) in test processing based on the material of the processing target (8) received by the receiving unit (216).

[Configuration 9]
The laser processing system according to any one of configurations 1 to 8, wherein
the laser processing device (2) determines a variation in the luminance values in a region to which the same irradiation condition is set in test processing based on the luminance values for the respective cells (S) calculated by the calculation unit (310), and
the setting unit (211) sets the irradiation condition for base treatment based on the information on the luminance values of the test cells (t) and the irradiation conditions set for the test cells (t) when the variation in the luminance values in the region exceeds a threshold value.

[Configuration 10]
The laser processing system according to any one of configurations 1 to 9, wherein the processing pattern (N) is a two-dimensional code.

[Configuration 11]
The laser processing system according to configuration 10, wherein the test cells (t) are set based on an information unit of the processing pattern (N).

[Configuration 12]

The laser processing system according to configuration 10 or 11, wherein the test cells (t) are set in a region of the processing pattern (N) excluding a region used to detect a position of the two-dimensional code.

The embodiments disclosed herein should be considered to be illustrative in all respects and not restrictive. The scope of the present invention is defined by the claims, instead of the descriptions stated above, and it is intended that meanings equivalent to the claims and all modifications within the scope are included.

REFERENCE SIGNS LIST

1: laser processing system, 2: laser marker, 3: verification device, 4: setting device, 6: display device, 7: input device, 8: processing target, 11a, 11b, 29: communication cable, 21: controller, 26: marking head, 28, 241: optical fiber, 110: processor, 120, 160: memory, 121, 161: ROM, 122, 162: RAM, 123, 163: flash memory, 130, 170: communication interface, 140: pulse generation circuit. 150: arithmetic circuitry, 151: main processor, 152: image processing dedicated processor, 210: control board, 211, 310: control unit, 212: pulse generating unit, 213, 320: storage unit, 214, 215, 216, 217, 340: communication processing unit, 220: driver, 230: driver power source, 240: laser oscillator, 242, 243, 249A, 249B, 249C, 249D: semiconductor laser, 244, 246, 262: isolator, 245, 248: coupler, 247: bandpass filter, 263: collimator lens, 264: galvano mirror unit, 264a, 264b: galvano mirror, 265: condenser lens, 330: imaging unit, 331: illumination unit, 332: light receiving unit, 700: user interface, 701: drawing region, 702, 703, 750, 760: button, 710: laser/scanning tab, N: processing pattern, S: cell, t: test cell, T: test cell region, W: laser light

The invention claimed is:

1. A laser processing system comprising:
a laser processing device configured to process a processing target in accordance with a processing pattern; and
a verification device configured to verify processing by the laser processing device, wherein
the processing pattern includes a plurality of cells,
the laser processing device includes:
a receiving unit configured to receive the processing pattern;
a setting unit configured to set an irradiation condition of laser light for each of the cells of the processing pattern received by the receiving unit;
a first storage unit configured to store the irradiation condition set by the setting unit for the each of the cells for which the irradiation condition is set; and
an irradiation unit configured to irradiate the processing target with the laser light based on the irradiation condition set by the setting unit,
the setting unit sets, as test cells, a part of the processing pattern received in test processing, and sets different irradiation conditions respectively for the cells included in the test cells,
the verification device includes:
an imaging unit configured to capture an image of the processing pattern formed on the processing target; and
a calculation unit configured to calculate luminance values for the cells respectively based on the image captured by the imaging unit, and
the setting unit sets at least one of the irradiation conditions for main processing, based on information on luminance values of the test cells extracted from the luminance values for the cells and based on the irradiation conditions set for the test cells.

2. The laser processing system according to claim 1, wherein
the verification device further includes a transmission unit configured to transmit the luminance values for the respective cells calculated by the calculation unit to the laser processing device, and
the setting unit further extracts information on the luminance values of the test cells based on arrangement information of the test cells and the luminance values for the respective cells received from the verification device.

3. The laser processing system according to claim 1, wherein
the verification device further includes a communication unit configured to communicate with the laser processing device,
the calculation unit further extracts information on the luminance values of the test cells based on arrangement information of the test cells and on the calculated luminance values for the respective cells,
the communication unit transmits the information on the luminance values of the test cells extracted by the calculation unit to the laser processing device, and
the setting unit receives the information on the luminance values of the test cells from the verification device.

4. The laser processing system according to claim 3, wherein the verification device acquires the arrangement information of the test cells from the laser processing device.

5. The laser processing system according to claim 3, wherein
the verification device further includes a second storage unit, and
the arrangement information of the test cells is stored in advance in the second storage unit.

6. The laser processing system according to claim 1, wherein
the information on the luminance values of the test cells includes at least one of information indicating a cell whose luminance is highest in the test cells and information indicating a cell whose luminance is lowest in the test cells, and
the setting unit sets the irradiation condition for main processing based on the irradiation condition set for the cell specified by the information on the luminance values of the test cells.

7. The laser processing system according to claim 1, wherein
the information on the luminance values of the test cells includes at least one of information indicating two or more cells selected in descending order of luminance in the test cells and information indicating two or more cells selected in ascending order of luminance in the test cells, and
the setting unit sets the irradiation condition for main processing based on at least one of an average value of the irradiation conditions set for two or more cells whose luminance is high among the cells specified by the information on the luminance values of the test cells and an average value of the irradiation conditions set for two or more cells whose luminance is low among the cells specified by the information on the luminance values of the test cells.

8. The laser processing system according to claim 1, wherein the receiving unit receives a material of the processing target, and the setting unit sets different irradiation conditions respectively for the cells on the test cells in test processing based on the material of the processing target received by the receiving unit.

9. The laser processing system according to claim 1, wherein the laser processing device determines a variation in the luminance values in a region to which a same irradiation condition is set in test processing based on the luminance values for the respective cells calculated by the calculation unit, and the setting unit sets the irradiation condition for base treatment based on the information on the luminance values of the test cells and the irradiation conditions set for the test cells when the variation in the luminance values in the region exceeds a threshold value.

10. The laser processing system according to claim 1, wherein the processing pattern is a two-dimensional code.

11. The laser processing system according to claim 10, wherein the test cells are set based on an information unit of the processing pattern.

12. The laser processing system according to claim 10, wherein the test cells are set in a region of the processing pattern excluding a region used to detect a position of the two-dimensional code.

* * * * *